(12) United States Patent
Thrane et al.

(10) Patent No.: US 12,327,019 B1
(45) Date of Patent: *Jun. 10, 2025

(54) SMART DATA STORAGE TIERS FOR DATA OBJECT TRANSITIONING

(71) Applicant: Amazon Technologies, Inc., Seattle, WA (US)

(72) Inventors: Leon Thrane, Issaquah, WA (US); Miles Childs Kaufmann, Seattle, WA (US); Suresh Kumar Golconda, Seattle, WA (US); Anand Chakraborty, Redmond, WA (US); Arvinth Ravi, Seattle, WA (US); Nikhil Menon, Seattle, WA (US); Shikha Sukumaran, Issaquah, WA (US); Bhavesh Anil Doshi, Redmond, WA (US); Phillip H. Pruett, IV, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,765

(22) Filed: Jun. 21, 2024

Related U.S. Application Data

(63) Continuation of application No. 18/215,695, filed on Jun. 28, 2023, now Pat. No. 12,045,465, which is a
(Continued)

(51) Int. Cl.
G06F 3/06 (2006.01)
(52) U.S. Cl.
CPC ........... *G06F 3/061* (2013.01); *G06F 3/0647* (2013.01); *G06F 3/0673* (2013.01)

(58) Field of Classification Search
CPC ..................................... G06F 3/06
See application file for complete search history.

(56) References Cited

U.S. PATENT DOCUMENTS

| 8,484,356 B1 | 7/2013 | Douglis et al. |
| 8,510,528 B2 | 8/2013 | Rubio et al. |

(Continued)

OTHER PUBLICATIONS

Cherubini et al., "Data Prefetching for Large Tiered Storage Systems," 2017 IEEE International Conference on Data Mining, 2017, 6 pages.

(Continued)

*Primary Examiner* — Khoa D Doan
(74) *Attorney, Agent, or Firm* — Davis Wright Tremaine LLP

(57) ABSTRACT

An object-based data storage service receives a request to store a data object in association with a smart data storage tier. Based at least in part on characteristics of the data object, the object-based data storage service identifies and stores the data object in a first location corresponding to a first data storage tier. The object-based data storage service monitors access to the data object to identify a second set of characteristics of the data object. This second set of characteristics is used to determine that the data object is to be transitioned to a second data storage tier. The object-based data storage service, based at least in part on this determination, stores the data object in a second location corresponding to the second data storage tier.

20 Claims, 10 Drawing Sheets

Related U.S. Application Data continuation of application No. 17/858,023, filed on Jul. 5, 2022, now Pat. No. 11,740,796, which is a continuation of application No. 16/797,372, filed on Feb. 21, 2020, now Pat. No. 11,392,296, which is a continuation of application No. 15/933,242, filed on Mar. 22, 2018, now Pat. No. 10,572,159.

(56) References Cited

U.S. PATENT DOCUMENTS

| | | |
|---|---|---|
| 8,799,413 B2 | 8/2014 | Taylor et al. |
| 8,918,439 B2 | 12/2014 | Alatorre et al. |
| 9,037,825 B1 | 5/2015 | Donlan et al. |
| 9,152,648 B2 | 10/2015 | Regni et al. |
| 9,355,060 B1 | 5/2016 | Barber et al. |
| 9,483,213 B1 | 11/2016 | Wharton et al. |
| 9,594,514 B1 | 3/2017 | Bono et al. |
| 9,658,983 B1 | 5/2017 | Barber et al. |
| 9,727,522 B1 | 8/2017 | Barber et al. |
| 9,747,287 B1 | 8/2017 | Bhardwaj et al. |
| 9,990,156 B1 | 6/2018 | Kandamuthan |
| 10,063,634 B2 | 8/2018 | Iyengar et al. |
| 10,216,772 B2 * | 2/2019 | Schuenzel ............. G06F 3/0605 |
| 10,394,766 B2 | 8/2019 | Dejana et al. |
| 10,552,058 B1 | 2/2020 | Jadon et al. |
| 2006/0059317 A1 | 3/2006 | Kakeda |
| 2006/0149635 A1 | 7/2006 | Bhatti et al. |
| 2006/0206675 A1 | 9/2006 | Sato et al. |
| 2008/0086616 A1 | 4/2008 | Asano et al. |
| 2008/0140679 A1 | 6/2008 | Deyo et al. |
| 2010/0082765 A1 | 4/2010 | Murase |
| 2010/0274825 A1 | 10/2010 | Nemoto et al. |
| 2011/0066586 A1 | 3/2011 | Sabel et al. |
| 2011/0161599 A1 | 6/2011 | Craske |
| 2011/0173400 A1 | 7/2011 | Isono |
| 2012/0110258 A1 | 5/2012 | Lakey et al. |
| 2012/0246403 A1 | 9/2012 | McHale et al. |
| 2013/0080727 A1 | 3/2013 | Naito et al. |
| 2013/0262533 A1 | 10/2013 | Mitra et al. |
| 2014/0244599 A1 | 8/2014 | Zhang et al. |
| 2014/0324920 A1 | 10/2014 | Hamilton et al. |
| 2014/0380012 A1 | 12/2014 | Sanford |
| 2016/0062689 A1 | 3/2016 | Cherubini et al. |
| 2016/0378629 A1 | 12/2016 | Gwozdz |
| 2017/0017663 A1 | 1/2017 | Huo et al. |
| 2017/0060918 A1 | 3/2017 | Iyer et al. |
| 2017/0262868 A1 | 9/2017 | Manjunath et al. |
| 2018/0007134 A1 | 1/2018 | Guim Bernat et al. |
| 2018/0217778 A1 * | 8/2018 | Kusbel ................... G06F 3/061 |
| 2018/0348998 A1 | 12/2018 | Mueller et al. |
| 2018/0357246 A1 | 12/2018 | Strogov et al. |
| 2018/0373722 A1 | 12/2018 | Ulasen et al. |
| 2019/0026048 A1 | 1/2019 | Muehge et al. |

OTHER PUBLICATIONS

Kazuichi, et al. "On-The-Fly Automated Storage Tiering (OTF-AST)," Proceedings of The Third Asian Conference on Information Systems—Special Session on Information Storage (ACIS-IS 2014), 2014, 9 pages.

Koltsidas et al., "Seamlessly Integrating Disk and Tape in a Multi-tiered Distributed File System," IEEE 31st International Conference on Data Engineering (ICDE), Apr. 13, 2015, 12 pages.

Höppli, et al., "Hera Object Storage: A Seamless, Automated Multi-Tiering Solution on Top of OpenStack Swift," IEEE 8th International Symposium on Cloud and Service Computing, 2018, 8 pages.

* cited by examiner ing usage of a data object to determine optimal
SMART DATA STORAGE TIERS FOR DATA OBJECT TRANSITIONING

CROSS-REFERENCE TO RELATED APPLICATION

This application is a continuation of U.S. patent application Ser. No. 18/215,695, filed Jun. 28, 2023, entitled "SMART DATA STORAGE TIERS FOR DATA OBJECT TRANSITIONING," which is a continuation of U.S. patent application Ser. No. 17/858,023, filed Jul. 5, 2022, now U.S. Pat. No. 11,740,796, entitled "SMART DATA STORAGE TIERS FOR DATA OBJECT TRANSITIONING," which is a continuation of U.S. patent application Ser. No. 16/797,372, filed Feb. 21, 2020, now U.S. Pat. No. 11,392,296, entitled "SMART DATA STORAGE TIERS FOR DATA OBJECT TRANSITIONING," which is a continuation of U.S. patent application Ser. No. 15/933,242, filed Mar. 22, 2018, now U.S. Pat. No. 10,572,159, entitled "SMART DATA STORAGE TIERS FOR DATA OBJECT TRANSITIONING," the disclosures of which are incorporated herein by reference in their entirety. This application also incorporates by reference for all purposes the full disclosure of U.S. patent application Ser. No. 15/933,216, filed Mar. 22, 2018, entitled "AUTOMATED TIER-BASED TRANSITIONING FOR DATA OBJECTS."

BACKGROUND

The use of remote and network-based storage services, such as object-based data storage services, has proliferated in recent years. Object-based data storage services enable users ranging from large organizations to individuals to utilize storage resources provided by these services for retaining and managing their data. With object-based data storage services, users may forego the initial setup costs associated with purchasing storage equipment, such as hard drives, solid state drives, and the like. Instead, users may leverage readily available storage resources of a service provider at a fraction of the cost associated with establishing dedicated storage for their data. As users access their data over time, they may transition their data to different storage tiers to further reduce their cost in storing their data. However, manually transitioning data can be cumbersome and result in inefficiencies that can instead result in added costs to these users if the rate of access for their data suddenly changes, negating any cost benefit that may be had by using these storage services.

BRIEF DESCRIPTION OF THE DRAWINGS

Various techniques will be described with reference to the drawings, in which.

DETAILED DESCRIPTION

Figure 1:
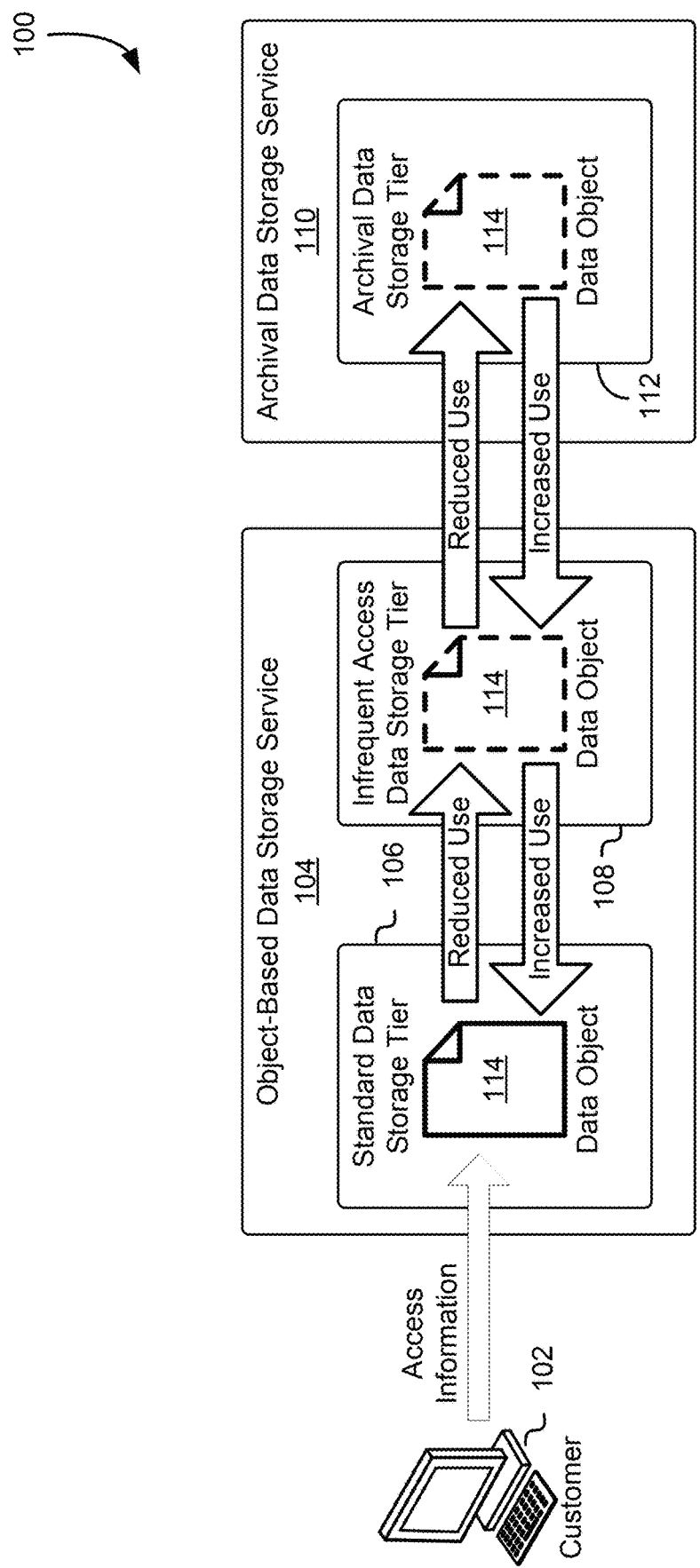
FIG. 1 shows an illustrative example of a system in which various embodiments can be implemented.

Techniques described and suggested herein relate to the automated transition of data objects among various data storage tiers of an object-based data storage service based on access patterns and characteristics of these data objects. In an example, a customer of an object-based data storage service submits a request to the object-based data storage service to store a data object in a logical data container that is classified as being in a standard data storage tier. The standard data storage tier may serve as a general purpose storage class for data objects that are accessed frequently by users. Further, logical data containers classified as being in the standard data storage tier may be designed to provide high throughput, with low latency, to enable immediate access to data objects stored in these logical data containers. In an example, the object-based data storage service provides users with an option to automatically transition data objects maintained in the standard data storage tier to an infrequent access data storage tier or to an archival data storage service based on usage data for these data objects.

In one example, if a user opts to enable automatic transitioning of data objects to other data storage tiers and/or to the archival data storage service based on usage data for these data objects, the object-based data storage service monitors access to these data objects over time to determine whether the access patterns for these data objects is consistent with the data storage tier the data objects are placed in. For example, if the object-based data storage service determines, based on usage data obtained for a particular data object or group of data objects (e.g., arbitrarily grouped by the user of by the object-based data storage service, etc.), that the data object is being used infrequently, the object-based data storage service may transition the data object from the standard data storage tier to an infrequent access data storage tier. This infrequent access data storage tier may include logical data containers that enable long-term storage of data objects at a reduced cost. However, users may incur a fee each time the user access a data object from a logical data container in the infrequent access data storage tier. Thus, based on usage data for a data object in the infrequent access data storage tier, if there is an increase in the frequency of use for the data object, the object-based data storage service may transition the data object to the standard data storage tier to enable access to the data object without incurring a fee to access the data object.

In an example, to further reduce the cost of storage of data objects, if the object-based data storage service determines that a data object has not been used over an extended period of time, the object-based data storage service transitions the data object to an archival data storage service. The archival data storage service may provide access to data objects stored therein in response to a retrieval task submitted to the archival data storage service. To reduce the cost of storage, these retrieval tasks may be completed over a period of time and, thus, may not be instantaneous. In an example, if the object-based data storage service determines, based on usage data for data objects stored in the archival data storage service, that these data objects are being utilized at a rate that makes using the archival data storage service inefficient for users, the object-based data storage service transitions these data objects from the archival data storage service to a logical data container in the infrequent access data storage tier or to a logical data container in the standard data storage tier.

In an example, the object-based data storage service provides users with an option to store data objects in a smart data storage tier. If a user opts to place a data object in the smart data storage tier, the object-based data storage tier may obtain usage data for the user's other data objects that are classified as being in the smart data storage tier, as well as in other data storage tiers (e.g., standard and infrequent access) and the archival data storage service. The object-based data storage service may identify the characteristics of the data object added to the smart data storage tier and compare these characteristics to those of other data objects of the user to identify similar data objects. Thus, the object-based data storage service may use the usage data for each of these similar data objects to identify an initial placement for the data object added by the user. This may include placement of the data object in the standard data storage tier, the infrequent access data storage tier, or the archival data storage service. Thus, by adding the data object to the smart data storage tier, the user may avoid having to determine which storage tier to place the data object initially. The object-based data storage service may monitor the characteristics of the data object classified as being in the smart data storage tier and the usage data for the data object to determine the optimal placement of the data object.

In this manner, an object-based data storage service can automatically transition data objects of a user among different data storage tiers based on usage data for these data objects and without need for users to define lifecycle policies to enable these transitions. In addition, the techniques described and suggested herein facilitate additional technical advantages. For instance, because the object-based data storage service automatically transitions data objects among different data storage tiers based on usage data for these data objects, the object-based data storage service may reduce the cost for users to maintain their data objects using the object-based data storage service and/or the archival data storage service. Further, because the object-based data storage service determines optimal placement for data objects based on usage data for these data objects, the object-based data storage service may increase the efficient of its storage systems as less-frequently accessed data objects are transitioned, over time, to storage systems in an infrequent access data storage tier or to an archival data storage service, which may maintain storage systems configured for less frequent access of these data objects.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a customer 102 of an object-based data storage service 104 submits a request to store a data object 114 in a logical data container classified as being in a standard data storage tier 106. The object-based data storage service 104 may be a service provided by a computing resource service provider. The object-based data storage service 104 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The data stored in the object-based data storage service 104 may be organized into data objects, such as data object 114. The data objects may have arbitrary sizes and may, in some instances, have constraints on size. Thus, the object-based data storage service 104 may store numerous data objects of varying sizes. The object-based data storage service 104 may operate as a key value store that associates data objects with identifiers of the data objects which may be used by the customer 102 to retrieve or perform other operations in connection with the data objects stored by the object-based data storage service 104. Access to the object-based data storage service 104 may be through application programming interface (API) calls to the service or via an interface, such as a graphical user interface (GUI).

In an embodiment, the object-based data storage service 104 provides different data storage tiers for different data object use cases. These different data storage tiers may provide benefits to the customer 102 and other users based at least in part on the usage of data objects classified accordingly. For example, as illustrated in FIG. 1, the object-based data storage service 104 provides a standard data storage tier 106, which can be utilized to classify data objects that are to be accessed frequently by the customer 102 and other users (e.g., data utilized for dynamic websites, content distribution, mobile and gaming applications, analytics, etc.). Data objects classified as being in the standard data storage tier 106 may be stored on computer systems that enable rapid availability with minimal latency. Thus, in some instances, the object-based data storage service 104 may provide cost savings to the customer 102 by enabling frequently used data objects classified as being in the standard data storage tier 106 to be accessed without incurrence of a fee per data access.

The object-based data storage service 104 may also provide an infrequent access data storage tier 108, which may be utilized to classify data objects that are accessed at a lesser frequency than other data objects classified as being in the standard data storage tier 106. For instance, a customer 102 may request storage of the data object 114 in a logical data container classified as being in the infrequent access data storage tier 106 if the data object 114 is to be used for, among other things, disaster recovery or as a redundant backup of other data objects. Data objects classified in the infrequent data storage access tier 106 may be stored on computer systems that enable rapid availability with minimal latency but at a lower cost than that of the standard data storage tier 104. However, each request to access a data object classified as being in the infrequent access data storage tier 106 may be subject to a fee. Thus, if a data object 114 is utilized at a low rate, it may be more cost-effective for the data object 114 to be classified as being in the infrequent access data storage tier 106, as the savings resulting from the reduced cost of storage may outweigh the expense of accessing the data object 114 at the low rate. It should be noted that while the standard data storage tier 106 and the infrequent access data storage tier 108 are used throughout the present disclosure for the purpose of illustration, additional and/or alternative data storage tiers may be utilized for the management of data objects by the object-based data storage service 104. For instance, as described in greater detail below, data objects may be classified as being in a smart data storage tier, which may result in monitoring of these data objects to determine an optimal storage location for these data objects.

In an embodiment, the customer 102, via an interface provided by the object-based data storage service 104, submits a request to store a data object 114 in a logical data container. The request may specify a desired classification for the data object 114, such as a classification corresponding to the standard data storage tier 106 or to the infrequent access data storage tier 108. Further, in an embodiment, the request specifies whether the object-based data storage service 104 is to monitor access to the data object 114 to determine whether to transition the data object 114 from a logical data container corresponding to the selected data storage tier to a logical data container corresponding to another data storage tier or to an archival data storage service 110. The archival data storage service 110 may be a service provided by a computing resource service provider or other service provider that may be accessed and utilized by the object-based data storage service 104 on behalf of the customer 102.

The archival data storage service 110 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The archival data storage service 110 may provide storage for data archiving and backup of customer data, such as the data object 114. The archival data storage service 110 may thus persistently store data that may be infrequently accessed and for which long retrieval times are acceptable to a customer 102 utilizing the service. A customer 102 or the object-based data storage service 104 may interact with the archival data storage service 110 to generate one or more archives. Each archive may represent one or more data files that may be combined to form the archive. Accordingly, a customer 102 or the object-based data storage service 104, through API calls to the service, may upload and retrieve archives from the archival data storage service 110 and monitor the retrieval of these archives, as each retrieval job may typically require several hours to complete.

In an embodiment, in response to the request from the customer 102 to store a data object 114 in a logical data container corresponding to a particular data storage tier, the object-based data storage service 104 identifies a logical data container that is classified as being in the specified data storage tier and stores the data object 114 therein. A logical data container is a logical unit of storage maintained by the object-based data storage service 104 and may correspond to a unit of storage of a computer system, such as a portion of a physical hard drive, solid state drive, memory (e.g., flash memory, random access memory (RAM), etc.), a removable drive (e.g., Universal Serial Bus (USB) flash memory drives, floppy disks, external hard drives, etc.), and the like. Each logical data container may include metadata, which may specify the classification of the logical data container (e.g., which data storage tier it is a part of, etc.) and the data objects stored therein. Thus, based at least in part on the data storage tier specified by the customer 102, the object-based data storage service 104 may identify a logical data container that, according to its metadata, is classified as being in the data storage tier specified by the customer 102.

If the customer 102 has indicated, in its request, that access and usage of the data object 114 is to be monitored to determine an optimal placement of the data object 114 over time, the object-based data storage service 104 may monitor the data object 114. For instance, usage of the data object 114 may be recorded in a data log, which may specify the time at which the data object 114 was accessed and the duration of such access. The object-based data storage service 104 may evaluate this data log to identify a frequency over time that the data object 114 is utilized by the customer 102 and other authorized users. In some instances, the object-based data storage service 104 may compare this usage frequency of the data object 114 to the usage frequency of other data objects classified as being in the same data storage tier. If the usage frequency of the data object 114 is lower than the average usage frequency for other data objects classified as being in the same data storage tier, the object-based data storage service 104 may transition the data object 114 to a logical data container corresponding to another data storage tier. For example, if the data object 114 is classified as being in the standard data storage tier 106, the object-based data storage service 104 may transfer the data object 114 to a logical data container classified as being in the infrequent access data storage tier 108 or to the archival data storage service 110. Similarly, if the usage frequency of the data object 114 is greater than the average usage frequency for other data objects classified as being in the same data storage tier, the object-based data storage service 104 may transition the data object 114 to a logical data container corresponding to another data storage tier if the data object 114 is not in the optimal data storage tier (e.g., standard data storage tier 106).

In an embodiment, the object-based data storage service 104 utilizes machine learning techniques, such as supervised learning techniques to determine optimal placement of the data object 114 over time and to create prediction metadata, which may specify an optimal data storage tier for the data object 114. A machine learning algorithm may utilize, as input, usage data for a particular data object garnered from one or more data usage logs for the data object 114. Further, in some instances, the machine learning algorithm may also utilize usage data for other data objects of the customer 102 and/or of other similar data objects of the customer 102 or of other customers (e.g., same type, stored in a logical data container corresponding to the same data storage tier of the data object 114, etc.). In some examples, the machine learning algorithm may utilize prediction metadata for other similar data objects as input. Other input to the machine learning algorithm may include a customer's history in selecting the primary data storage tier for its data objects, a customer's analyzed behavior based at least in part on the costs incurred to the customer 102 with regard to storage of its data objects, and the like. A machine learning algorithm may, at any time, utilize one or more sample vectors to perform one or more simulations to determine whether the functions utilized by the object-based data storage service 104 to determine placement of monitored data objects are producing correct and accurate results and/or to refine the one or more functions utilized by the object-based data storage service 104 to produce correct and accurate results. For instance, during initialization of the machine learning algorithm, the object-based data storage service 104 may provide the machine learning algorithm with one or more sample vectors and analytical results (e.g., desired outcomes) that should be obtained based at least in part on these one or more sample vectors. The machine learning algorithm, based at least in part on this exercise, may adjust the functions utilized by the object-based data storage service 104 to analyze the vectors corresponding to activity associated with use of the monitored data objects.

The machine learning algorithm may receive input from one or more analysts employed by the a computing resource service provider to analyze the results from the one or more analyses performed by object-based data storage service 104 through use of the one or more functions described above. For instance, an analyst may review the data logs and the one or more vectors generated by the object-based data storage service 104 to determine whether a data object 114 should be transitioned from its current data storage tier to another data storage tier or to the archival data storage service 110. The analyst may provide his/her input for use in refining a function used to classify vector input as corresponding to a decision to transition the data object 114 to another data storage tier, to transition the data object to the archival data storage service 110, or to maintain the data object 114 in the current data storage tier. The vector of measurements corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the object-based data storage service 104 to increase the likelihood that the desired result is obtained in future analyses.

The function used to classify measurement vectors may vary in accordance with various embodiments. For example, in some embodiments, support vector machine techniques are used to classify regions in Euclidean space as indicative of a need to transition a data object 114 to another data storage tier, indicative of a need to transition a data object 114 to an archival data storage service 110, or indicative of the data object 114 being currently stored in an optimal location. This may be used so that measurements are classified in accordance with the region in which the measurement vectors fall. In yet another embodiment, the machine learning algorithm can utilize decision tree learning to determine a decision (classification, regression) tree used to classify vector input as being indicative of a need to transition a data object 114 to another data storage tier, indicative of a need to transition a data object 114 to an archival data storage service 110, or indicative of the data object 114 being currently stored in an optimal location. As a fictitious illustrative example, if a minimum requirement established by the object-based data storage service 104 for classifying a data object 114 as necessitating a transition to the archival data storage service 110 is that the data object 114 has not been utilized by a user over a particular period of time greater than a threshold period of time and that the frequency of use would result in a greater expense being incurred if maintained in the current data storage tier, the machine learning may result in a decision tree that, at least in part, bifurcates based on vector components indicating whether the period of inactivity for the data object 114 is greater than a threshold amount of time and whether it is cost ineffective to maintain the data object 114 in the current data storage tier based at least in part on the frequency of use of the data object 114. If the input indicates that the data object 114 has been inactive for a period of time greater than the period of time threshold and that it is cost ineffective to the customer 102 to maintain the data object 114 in its current data storage tier, the one or more functions (decision trees) would, in this example, provide a result that the data object 114 is to be transitioned to the archival data storage service 110. Thus, the machine learning algorithm may adjust the one or more functions if these one or more functions do not indicate that the data object 114 should be transitioned to the archival data storage service 110.

If, based at least in part on output from the machine learning algorithm (e.g., the prediction metadata), the object-based data storage service 104 determines that the data object 114 is to be transitioned from the standard data storage tier 106 to the infrequent access data storage tier 108, the object-based data storage service 104 may identify a logical data container corresponding to the infrequent access data storage tier 108 that has sufficient capacity to support the data object 114. If a logical data container is identified, the object-based data storage service 104 may transfer the data object 114 to the logical data container. Further, the object-based data storage service 104 may update the metadata of the logical data container to indicate that the data object 114 is now stored within the logical data container. In some embodiments, the object-based data storage service 104 transmits a notification to the customer 102 to indicate that the data object 114 has been transferred to a logical data container corresponding to the infrequent access data storage tier 108.

In an embodiment, if the object-based data storage service 104 determines, based at least in part on usage data for the data object 114 and a predicted cost assessment for storage and use of the data object 114, that the data object 114 is to be stored in the archival data storage service 110, the object-based data storage service 104 transmits a request to the archival data storage service 110 to store the data object 114. In response to the request, the archival data storage service 110 may store the data object 114 in an archive classified, through metadata, as being in an archival data storage tier 112. In an embodiment, usage data for the data object 114 is provided by the archival data storage service 110 to the object-based data storage service 104, which may utilize this information in conjunction with the aforementioned machine learning techniques to determine the optimal storage location for the data object 114.

In an embodiment and as described above, the output from the machine learning algorithm includes prediction metadata for the particular data object 114. The prediction metadata may specify an optimal data storage tier for the data object 114 based at least in part on the usage data. Additionally, or alternatively, the prediction metadata may provide information regarding storage of the data object 114 in accordance with the various data storage tiers based at least in part on other parameters (e.g., cost of maintaining the data object 114 in each data storage tier in accordance with a frequency of use, etc.). The prediction metadata may be stored along with the data object 114 in a corresponding logical data container. Alternatively, the object-based data storage service 104 may store the prediction metadata of the data object 114 in a centralized repository of the object-based data storage service 104, in a database of the customer's account profile, or in another location. In an embodiment, programmatic access to the prediction metadata is provided to other computer systems authorized to access the data object 114. This may enable these other computer systems to utilize the prediction metadata to make programmatic decisions regarding transitions of the data object 114 among the various data storage tiers.

In an embodiment, the prediction metadata is utilized by the object-based data storage service 104 to identify an initial placement for other data objects. For instance, if the customer 102 submits a request to the object-based data storage service 104 to store a data object, the object-based data storage service 104 may evaluate the prediction metadata for some or all of the customer's other data objects, as well as prediction metadata for similar data objects of the customer and/or of other customers (e.g., similar data type, similar data size, etc.), to identify an initial data storage tier for the data object. In an embodiment, based at least in part on prediction metadata for similar data objects and for other data objects of the customer 102, the object-based data storage service associates the data object with a smart data storage tier, which can be utilized by the object-based data storage service 104 as an indicator to monitor any data objects stored therein and to identify an optimal data storage tier to minimize the cost to the customer 102 for storage and use of the data object.

The object-based data storage service 104 may also identify an initial placement for other data objects without utilizing prediction metadata. For instance, the object-based data storage service 104 may determine an initial placement of a data object based at least in part on usage data for the customer's other data objects. Additionally, or alternatively, the object-based data storage service 104 may evaluate usage data for similar data objects, whether these similar data objects are associated with the customer 102 or other customers of the object-based data storage service 104. In an embodiment, if prediction metadata is not available for the data object 114 and for other existing data objects, the object-based data storage service 104 generates, using the aforementioned machine learning techniques, prediction metadata for these other existing data objects. The object-based data storage service 104 may utilize this newly created prediction metadata for the other existing data objects to generate (e.g., by interpolation, by extrapolation, through use of other heuristics or predictive methods, etc.) prediction metadata for the new data object that is to be stored. This interpolated prediction metadata may be used to identify the initial placement for the new data object.

If the data object 114 is transitioned to another data storage tier, the object-based data storage service 104 may update the prediction metadata to reflect storage of the data object 114 in accordance with this other data storage tier. For instance, the prediction metadata may be updated to indicate the optimal data storage tier for the data object 114 and that the data object 114 was transitioned to this optimal data storage tier as a result of identification of the optimal data storage tier based at least in part on the usage data for the data object 114. As additional usage data is obtained and processed for the data object 114, the prediction metadata may be updated to indicate the optimal data storage tier for the data object 114 at any given time.

In an embodiment, the prediction metadata is used, along with one or more parameters, as input to another machine learning algorithm to determine whether to transition the data object 114 to another data storage tier. The one or more parameters may include a constraint, specified by the customer or other authorized user, on the data storage tiers that the data object may be associated with. For example, the customer or other authorized user may specify that the data object 114 may only be transitioned between a standard data storage tier and an infrequent access data storage tier. Further, the customer or other authorized user may indicate cost limitations, which may be used to identify whether the optimal data storage tier specified in the prediction metadata would satisfy these cost limitations. The output of this machine learning algorithm may include a placement decision for the data object 114.

The object-based data storage service 104 may continue to evaluate usage data for the data object 114 over time to determine whether a transition of the data object 114 would result in greater cost savings for the customer 102 and/or for the object-based data storage service 104. Thus, if the data object 114 is utilized at a greater frequency over a period of time, and the data object 114 is stored in a logical data container corresponding to the infrequent access data storage tier 108 or is stored in the archival data storage service 110, the object-based data storage service 104 may transfer the data object 114 to a logical data container corresponding to the standard data storage tier 106. Thus, as the frequency of use changes for a data object 114, the object-based data storage service 104 may use this frequency of use, as well as other characteristics (e.g., cost efficiency, availability of the logical data container or data object 114 if transitioned, performance of the logical data container if transitioned, etc.) to determine the optimal placement of the data object 114.

Figure 2:
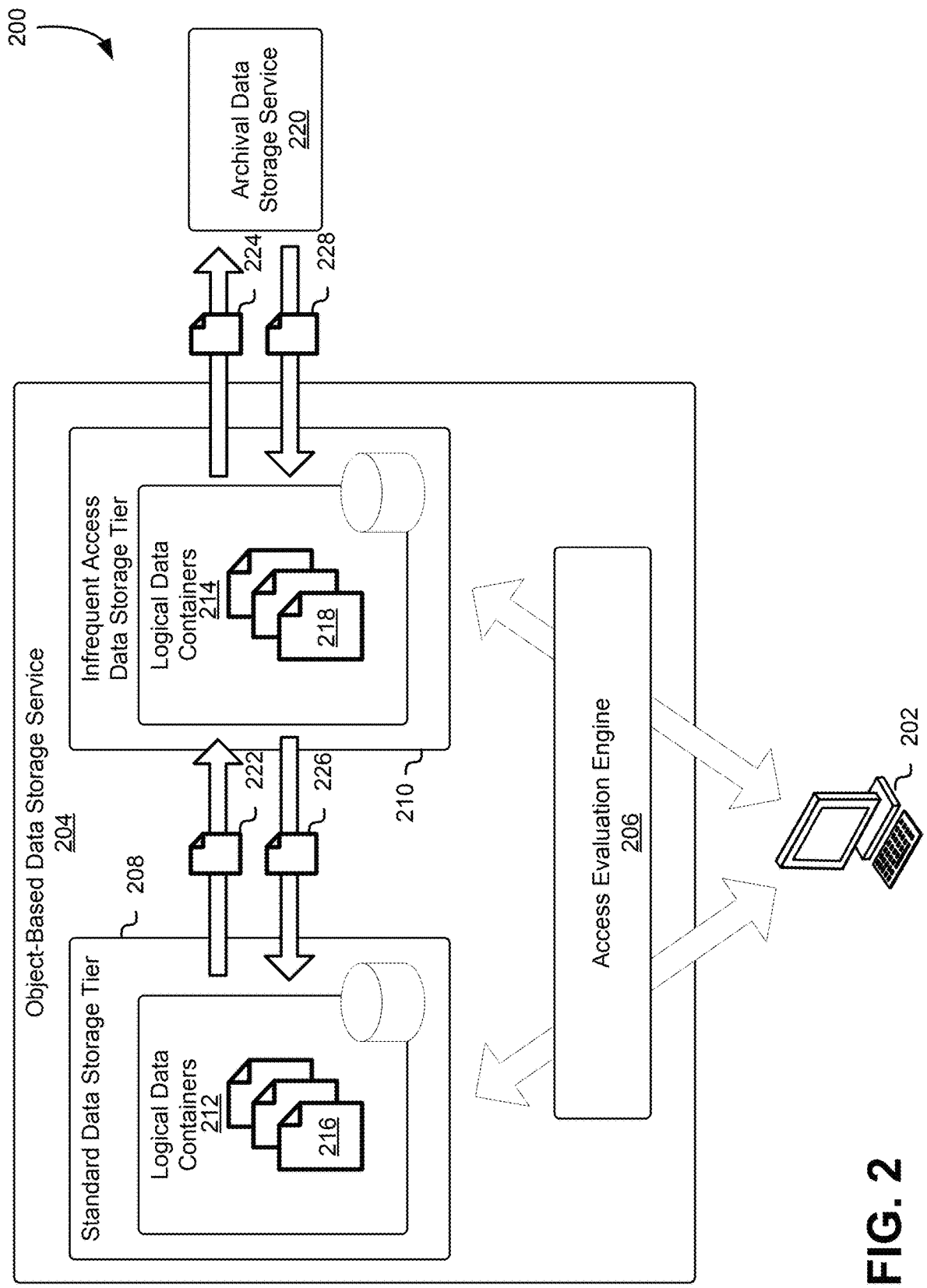
FIG. 2 shows an illustrative example of a system in which an access evaluation engine of an object-based data storage service transitions data objects among data storage tiers and an archival data storage service in accordance with at least one embodiment.

FIG. 2 shows an illustrative example of a system 200 in which an access evaluation engine 206 of an object-based data storage service 204 transitions data objects among data storage tiers and an archival data storage service 220 in accordance with at least one embodiment. In the system 200, an access evaluation engine 206 of the object-based data storage service 204 monitors access and usage of various data objects stored in logical data containers designated as being in a standard data storage tier 208 or the infrequent access data storage tier 210. As noted above, a customer 202 may request storage of a data object within a logical data container corresponding to either the standard data storage tier 208 or the infrequent access data storage tier 210. In an embodiment, the customer 202 specifies, in the request, that the object-based data storage service 204 is to monitor usage of the data object to determine the optimal storage location for the data object over time and, if an optimal storage location is identified, transfer the data object to that optimal storage location.

The access evaluation engine 206 may be implemented on a computer system of the object-based data storage service 204, or abstraction thereof (such as one or more virtual machines operating via a hypervisor), implemented using hardware and software, and may comprise one or more processors and memory that stores executable instructions whose execution by the one or more processors causes the computer system to perform operations described herein. For instance, the access evaluation engine 206 may monitor and record requests from the customer 202 or other users to access and utilize data objects in the logical data containers of the various data storage tiers. For example, if a customer 202 accesses one or more data objects 216 from logical data containers 212 corresponding to the standard data storage tier 208, the access evaluation engine 206 may monitor, for each data object, the use of the data object, the length of such usage, the time at which the data object was used, and the like. Similarly, if a customer 202 access one or more data objects 218 from logical data containers 214 corresponding to the infrequent access data storage tier 210, the access evaluation engine 206 may monitor, for each data object, the use of the data object, the length of such usage, the time at which the data object was used, and the like. This data may be recorded in a data log that is maintained by the access evaluation engine 206.

In an embodiment, the access evaluation engine 206 utilizes machine learning techniques, such as supervised learning techniques to determine optimal placement of a data object over time. For instance, the access evaluation engine 206 may evaluate a data log corresponding to a data object 222 from a logical data container 212 corresponding to the standard data storage tier 208 to identify a frequency at which the data object 222 has been accessed and used by the customer 202 and other users. Further, the access evaluation engine 206 may utilize the machine learning techniques to evaluate the cost efficiency of maintaining the data object 222 within the standard data storage tier 208 versus transferring the data object 222 to a logical data container 214 corresponding to the infrequent access data storage tier 210 or to the archival data storage service 220. In an embodiment, the access evaluation engine 206 may utilize a hysteresis loop corresponding to access frequency and storage costs within each of the tiers and the archival data storage service 220 to identify the optimal storage location for the data object. As noted above, data objects 216 in the standard data storage tier 208 may be accessed without incurrence of a fee but may be more expensive to store. However, each access of data objects 218 in the infrequent access data storage tier 210 may incur a fee but may be less expensive to store. Similarly, storage of data objects in the archival data storage service 220 may be even more inexpensive than both the infrequent access data storage tier 210 and the standard data storage tier 208, but may require significant time to retrieve data objects, which may result in additional expense to the customer 202. The access evaluation engine 206 may use this information as input to one or more machine learning algorithms to determine the optimal placement of the data object 222.

As noted above, the output from the machine learning algorithm may include prediction metadata for a particular data object being analyzed to determine optimal placement of the data object. The prediction metadata may specify an optimal data storage tier for the data object based at least in part on the usage data and/or information regarding storage of the data object in accordance with the various data storage tiers based at least in part on other parameters (e.g., cost of maintaining the data object in each data storage tier in accordance with a frequency of use, etc.). The access evaluation engine 206 may store the prediction metadata along with the data object in a corresponding logical data container or in a data archive in accordance with the data storage tier of the data object. Alternatively, the access evaluation engine 206 may store the prediction metadata of the data object in a centralized repository of the object-based data storage service 204, in a database of the customer's account profile, or in another location. A customer 202 may be provided with programmatic access to the prediction metadata via the access evaluation engine 206 or through another system of the object-based data storage service 204. This may enable the customer 202 to utilize the prediction metadata to make programmatic decisions regarding transitions of the data object among the various data storage tiers.

As illustrated in FIG. 2, the access evaluation engine 206 has determined that the optimal placement of the data object 222 is within the infrequent access data storage tier 210. Based at least in part on this determination, the access evaluation engine 206 may transfer the data object 222 from a logical data container 212 corresponding to the standard data storage tier 208 to a logical data container 214 corresponding to the infrequent access data storage tier 210. The access evaluation engine 206 may update the metadata of the logical data container 212 to indicate removal of the data object 222 from the logical data container 212. Further, the access evaluation engine 206 may update the metadata of the logical data container 214 to indicate storage of the data object 222 within the logical data container 214.

Similarly, if the access evaluation engine 206 determines that the optimal placement of a data object 224 stored in a logical data container 214 corresponding to the infrequent access data storage tier 210 is within the archival data storage service 220, the access evaluation service 206 may transfer the data object 224 to the archival data storage service 220. The access evaluation engine 206 may transmit a request to the archival data storage service 220 to store the data object 224 within an archive of the archival data storage service 220. The access evaluation engine 206 may also transmit requests, over time, to the archival data storage service 220 to obtain usage data corresponding to the data object 224 and any other data objects stored within the archive. Based at least in part on this usage data, the access evaluation engine 206 may determine whether to transfer a data object, such as data object 228, from the archival data storage service 220 to a logical data container 214 corresponding to the infrequent data storage tier 210 or to a logical data container 212 corresponding to the standard data storage tier 208.

If a data object, such as data object 226, that is stored in a logical data container 214 corresponding to the infrequent access data storage tier 210 is utilized at a frequency that would result in a greater expense to the customer 202 that maintaining the data object in the standard data storage tier 208, the access evaluation engine 206 may transfer the data object 226 from a logical data container 214 corresponding to the infrequent access data storage tier 210 to a logical data container 212 corresponding to the standard data storage tier 208. The access evaluation engine 206 may update the metadata of the logical data container 214 to indicate removal of the data object 226 from the logical data container 214. Further, the access evaluation engine 206 may update the metadata of the logical data container 212 to indicate storage of the data object 226 within the logical data container 212.

Figure 3:
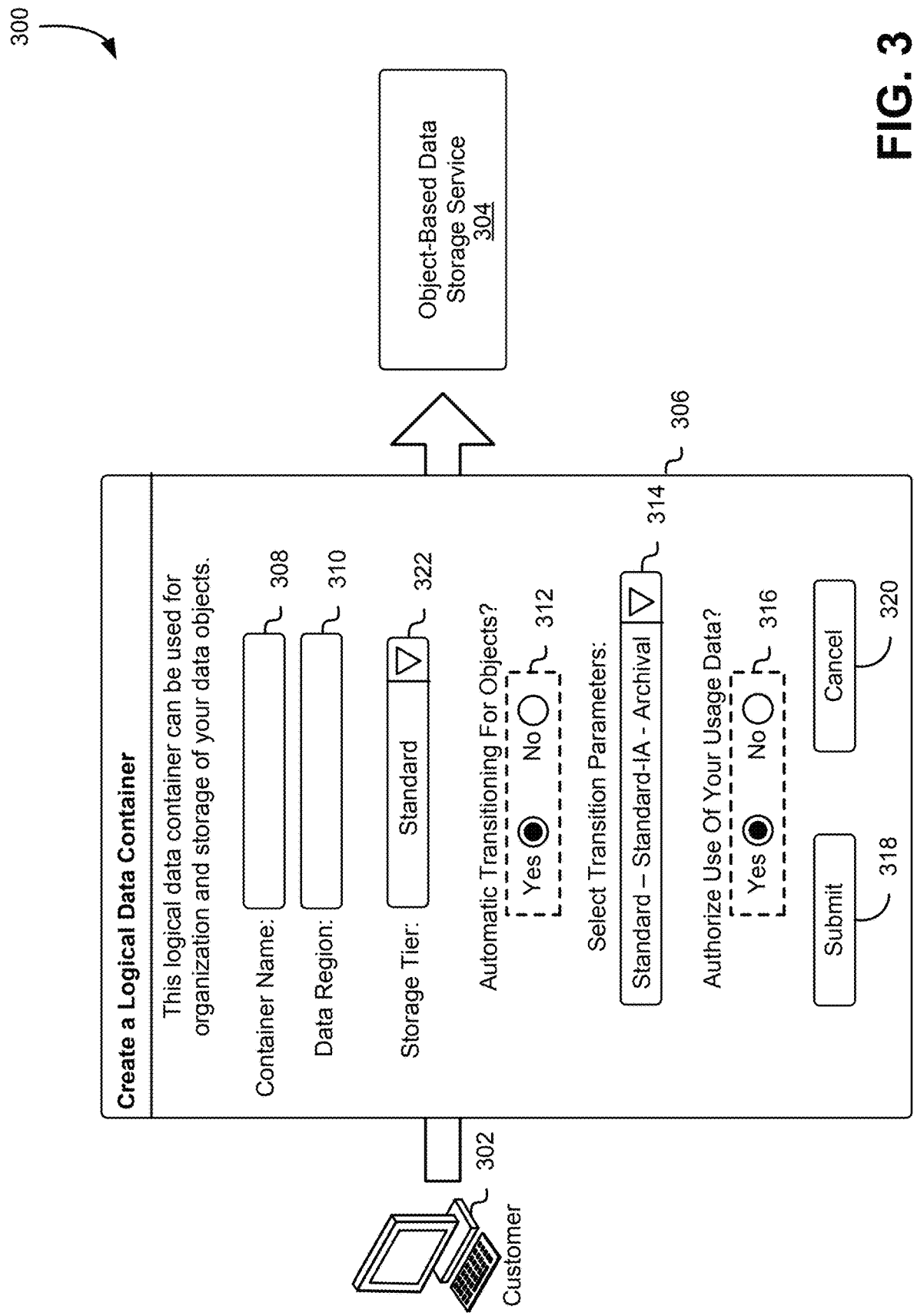
FIG. 3 shows an illustrative example of a system in which an interface is provided to a customer to request automatic transitioning of data objects within a logical data container in accordance with at least one embodiment.

To enable monitoring and automatic transitioning of data objects to their optimal storage location, a customer of the object-based data storage service may specify, via an interface, that the object-based data storage service is to monitor these data objects to determine an optimal placement for these data objects. The object-based data storage service may provide this interface to the customer, which may enable the customer to generate a logical data container and associate this particular logical data container with a particular data storage tier. If the customer indicates that data objects in this logical data container are to be monitored for optimal placement of these data objects, the object-based data storage service may utilize an access evaluation engine to monitor and record usage information for these data objects. Accordingly, FIG. 3 shows an illustrative example of a system 300 in which an interface 306 is provided to a customer 302 to request automatic transitioning of data objects within a logical data container in accordance with at least one embodiment.

In the system 300, the object-based data storage service 304 provides, to a customer 302, an interface 306 usable to request creation of a logical data container for storage of data objects and to request monitoring for data objects that may be stored in the requested logical data container. In an embodiment, the interface 306 is a GUI, although requests to the object-based data storage service 304 may be submitted using API calls or other techniques. The interface 306 may include a container name input field 308, which may be utilized by the customer 302 to provide a name for the logical data container that is being requested by the customer 302. Further, the interface 306 may include a data region input field 310, which the customer 302 may use to define the data region in which the logical data container is to be created. In some instances, the data region input field 310 may include a drop down menu, which may provide an ordering of the available data regions maintained by a computing resource service provider where the logical data container may be created.

The interface 306 may also include a storage tier drop down menu 322, which the customer 302 may utilize to define the corresponding data storage tier or other data storage characteristics for the logical data container. The customer 302 may select a standard data storage tier for the logical data container if the customer 302 plans to utilize data objects in the logical data container frequently and requires rapid access to these data objects. Alternatively, if the customer 302 determines that the logical data container is not going to be used frequently but still requires rapid access to data objects stored therein, the customer 302 may select an option for the infrequent access data storage tier from the storage tier drop down menu 322. The data storage characteristics specified via the storage tier drop down menu 322 may each correspond to a set of data storage parameters. A set of data storage parameters may specify one or more risks corresponding to storage of a data object amongst the various data storage tiers made available by the object-based data storage service. For instance, if the customer selects, from the storage tier drop down menu 322, the standard data storage tier, the object-based data storage service may determine that the customer assumes the risk of incurring greater costs if a data object stored in a logical data container corresponding to the standard data storage tier is utilized infrequently or at a rate that would make it more expensive to the customer versus storing the data object in another data storage tier. As another example, if the customer selects the infrequent access data storage tier from the storage tier drop down menu 322, the object-based data storage tier may determine that the customer assumes the risk of incurring greater costs if a data object stored in a logical data container corresponding to the infrequent access data storage tier is accessed at a rate that would result in greater cost to the customer versus storing the data object in the standard data storage tier. In an embodiment, the object-based data storage service utilizes the set of data storage parameters to determine the data storage tier for storage of the data object. Other risks that may be specified in the set of data storage parameters include risks associated with potential loss of data or of the data object itself, availability of resources corresponding to the data storage tiers for storage of the data object, potential delays in availability of these resources, likelihood of failures of the software and/or hardware layers of the object-based data storage service, and the like.

In an embodiment, the interface 306 includes one or more radio buttons 312 that can be used by the customer 302 to enable automatic transitioning of data objects stored in the logical data container that is to be created. If the customer 302 uses the one or more radio buttons 312 to indicate that the object-based data storage service 304 may automatically transition data objects from the logical data container to another data storage tier, the object-based data storage service utilize the characteristics of these data objects and cost efficiency information to identify the optimal placement of these data objects over time.

The interface 306 may also include a transition parameter drop down menu 314, which may enable the customer 302 to define the authorized transitions that may be performed by the object-based data storage service 304 for data objects stored in the logical data container. For instance, as illustrated in FIG. 3, the customer 302 may select an option via the transition parameter drop down menu 314 that would enable the object-based data storage service 304 to transition data objects among the standard data storage tier, the infrequent access data storage tier, and an archival data storage service as needed based at least in part on the characteristics of the data objects and cost efficiency information for the data objects. Through the transition parameter drop down menu 314, the customer 302 may limit the available transitions by the object-based data storage service 304. For example, if the logical data container and corresponding data objects are maintained in the standard data storage tier, the customer 302 may specify that data objects may only be transitions between the standard data storage tier and the infrequent access data storage tier. The elements of the transition parameter drop down menu 314 may change based at least in part on the storage tier selected via the storage tier drop down menu 322. For example, if the customer 302 has selected the standard data storage tier from the storage tier drop down menu 322, the options presented via the transition parameter drop down menu 314 may include the standard data storage tier. In an embodiment, if the customer 302 specifies that automatic transitioning for data objects is not to be performed, the interface 306 may omit the transition parameter drop down menu 314 and not present this to the customer 302. In an embodiment, if the customer 302 selects an option via the transition parameter drop down menu 314 to enable the object-based data storage service 304 to transition data objects among the standard data storage tier, the infrequent access data storage tier, and an archival data storage service, the object-based data storage service 304 incorporates this option into the data storage parameters described above. This may enable the object-based data storage service 304 to utilize the set of data storage parameters for the data object to determine the initial data storage tier for the data object and as input, along with usage data for the data object, to the machine learning algorithms to determine whether to transition the data object to another data storage tier.

The interface 306 may further include one or more radio buttons 316 that can be used by the customer 302 to authorize the object-based data storage service 304 to utilize usage data for data objects in the logical data container for various purposes. For instance, this usage data may be collected and utilized by the object-based data storage service 304, along with the data object characteristics and cost efficiency information, to determine whether these data objects are placed in an optimal location and, if not, to transfer these data objects to the optimal location. Further, this usage data may be used in aggregate with usage data for other data objects as a reference for making determinations regarding transitions for other sets of data objects that may be monitored by the object-based data storage service 304.

To submit the request to generate the logical data container and to enable monitoring and transitioning of the data objects stored therein, the customer 302 may select a submit button 318 provided via the interface. The object-based data storage service 304 may receive the request and generate the logical data container in the specified data storage tier. Further, if the customer 302 has specified, via the interface 306, that data objects of the logical data container are to be monitored and transitioned to other data storage tiers based at least in part on usage data for these data objects, the object-based data storage service 304 may perform these operations for these data objects. If the customer 302 selects the cancel button 320 from the interface 306, the interface 306 may terminate without providing a request to the object-based data storage service 304.

Figure 4:
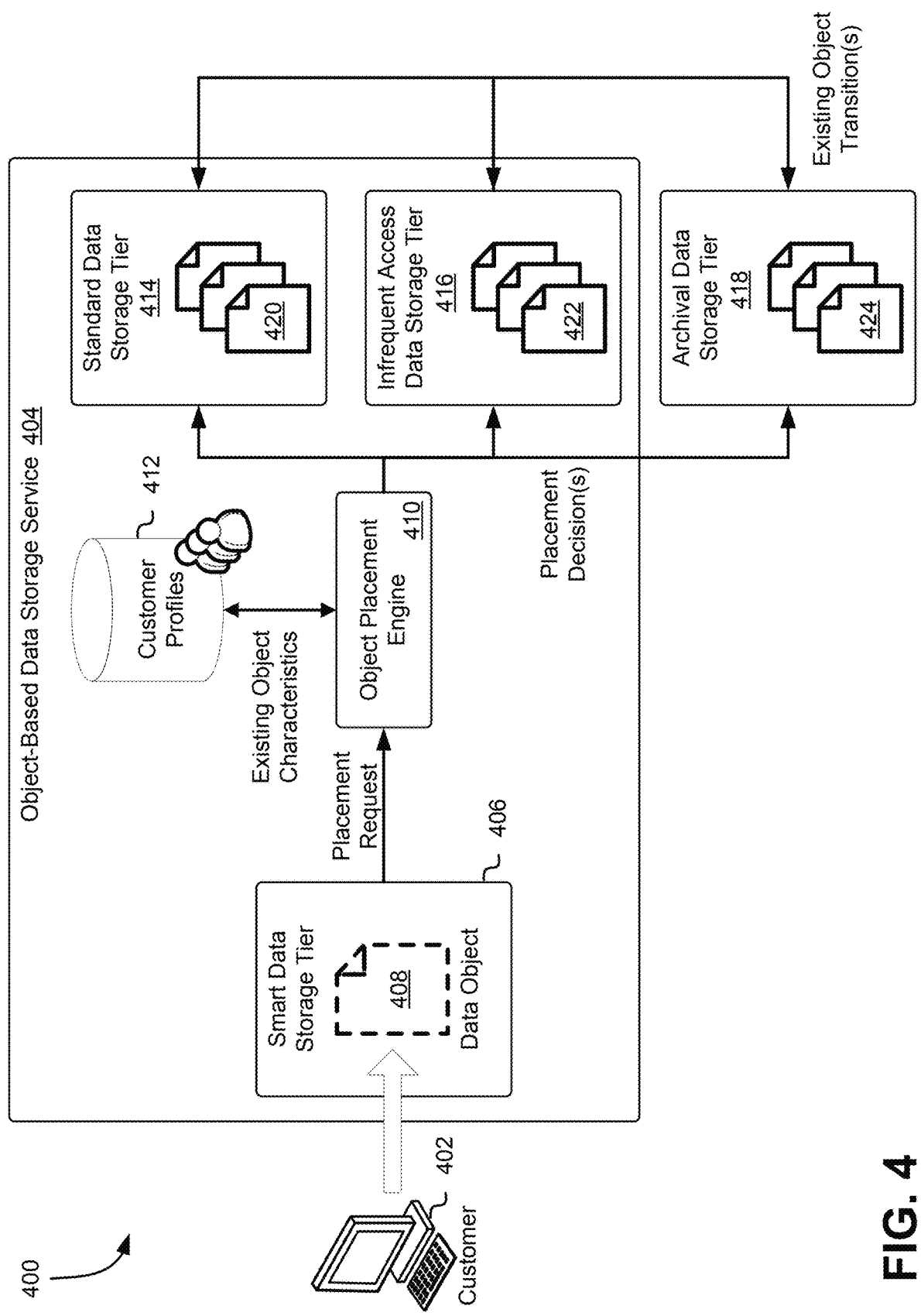
FIG. 4 shows an illustrative example of a system in which an object placement engine of an object-based data storage service determines placement of a data object from a smart data storage tier in accordance with at least one embodiment.

In an embodiment, the object-based data storage service provides a smart data storage tier to customers of the object-based data storage service to enable the object-based data storage service to automatically determine the optimal data storage location for each data object added to the smart data storage tier. Thus, a customer may not be required to specify an initial data storage tier for a data object, as the object-based data storage service may determine, based at least in part on the characteristics of the data object, the customer's use of other data objects, and usage data for similar data objects, an initial data storage location for the data object. Accordingly, FIG. 4 shows an illustrative example of a system 400 in which an object placement engine 410 of an object-based data storage service 404 determines placement of a data object from a smart data storage tier 406 in accordance with at least one embodiment.

In the system 400, a customer 402 of the object-based data storage service 404 submits a request to the object-based data storage service 404 to store a data object 408 in a logical data container corresponding to a smart data storage tier 406. The smart data storage tier 406 may be utilized by the object-based data storage service 404 as an indicator to monitor any data objects stored therein and to identify an optimal data storage tier to minimize the cost to the customer 402 for storage and use of the data object 408. Thus, while the standard data storage tier 414, the infrequent access data storage tier 416, and the archival data storage tier 418 may be associated with a particular storage cost and usage cost for data objects, the smart data storage tier 406 may not have a storage cost or usage cost associated with placement of the data object 408 in the smart data storage tier 406.

If the customer 402 stores a data object 408 in a logical data container corresponding to the smart data storage tier 406, an initial placement request is sent by a computer system of the smart data storage tier 406 to an object placement engine 410 to identify a data storage tier where the data object 408 may be stored and monitored. The object placement engine 410 may be implemented on a computer system of the object-based data storage service 404, or abstraction thereof (such as one or more virtual machines operating via a hypervisor), implemented using hardware and software, and may comprise one or more processors and memory that stores executable instructions whose execution by the one or more processors causes the computer system to perform operations described herein. In response to the placement request, the object placement engine 410 may access, from a customer profile datastore 412, the customer's profile to identify any other data objects stored on behalf of the customer 402 in any other data storage tiers (e.g., standard data storage tier 414, infrequent access data storage tier 416, archival data storage tier 418, etc.). The object placement engine 410 may evaluate each of these data objects to identify the characteristics of these data objects. Further, the object placement engine 410 may obtain usage data for each of these data objects from the access evaluation engine described above.

Utilizing the usage data from the access evaluation engine and the characteristics of existing data objects of the customer 402 as input to one or more machine learning algorithms, the object placement engine 410 may identify an initial placement location for the data object 408. The machine learning algorithms utilized by the object placement engine 410 may be similar to those described above in connection with the access evaluation engine except that these machine learning algorithms may additionally utilize the characteristics of existing data objects of the customer 402 as input. The output of the machine learning algorithms may be a placement decision corresponding to the initial placement location of the data object 408. The object placement engine 410, based at least in part on the placement decision, may transfer the data object 408 to a logical container of the standard data storage tier 414 or of the infrequent access data storage tier 416 or to an archive of the archival data storage tier 418.

In an embodiment, the data object 408 is stored with metadata specifying that the data object 408 is a member of the smart data storage tier 406. Thus, if the customer 402 opts to evaluate the placement of the data object 408 via an interface of the object-based data storage service 404, the data object 408 may be presented as being in the smart data storage tier 406 and not in any other data storage tier, even though the data object 408, for purposes of fee calculation, may be stored in a logical data container corresponding to another data storage tier.

The object placement engine 410 may further evaluate, for an existing data object of the smart data storage tier 406, any new usage data for the data object and characteristics of existing data objects 420, 422, 424 in the various data storage tiers 414, 416, 418 to determine whether the optimal storage location for the data object differs from its current storage location. If the object placement engine 410 determines a new optimal storage location for the data object, the object placement engine 410 may transfer the data object from its current data storage tier to a logical data container corresponding to the optimal data storage tier. In an embodiment, the metadata for the data object maintains an association with the smart data storage tier 406 regardless of how the data object is transitioned by the object placement engine 410. The evaluation of an existing data object may be similar to that performed by the access evaluation engine 206 discussed above in connection with FIG. 2, except that the object placement engine 410 may also evaluate usage data for other data objects classified as being in the smart data storage tier 406, as well as the characteristics of these data objects, to generate a placement decision for an existing data object classified as being in the smart data storage tier 406.

Figure 5:
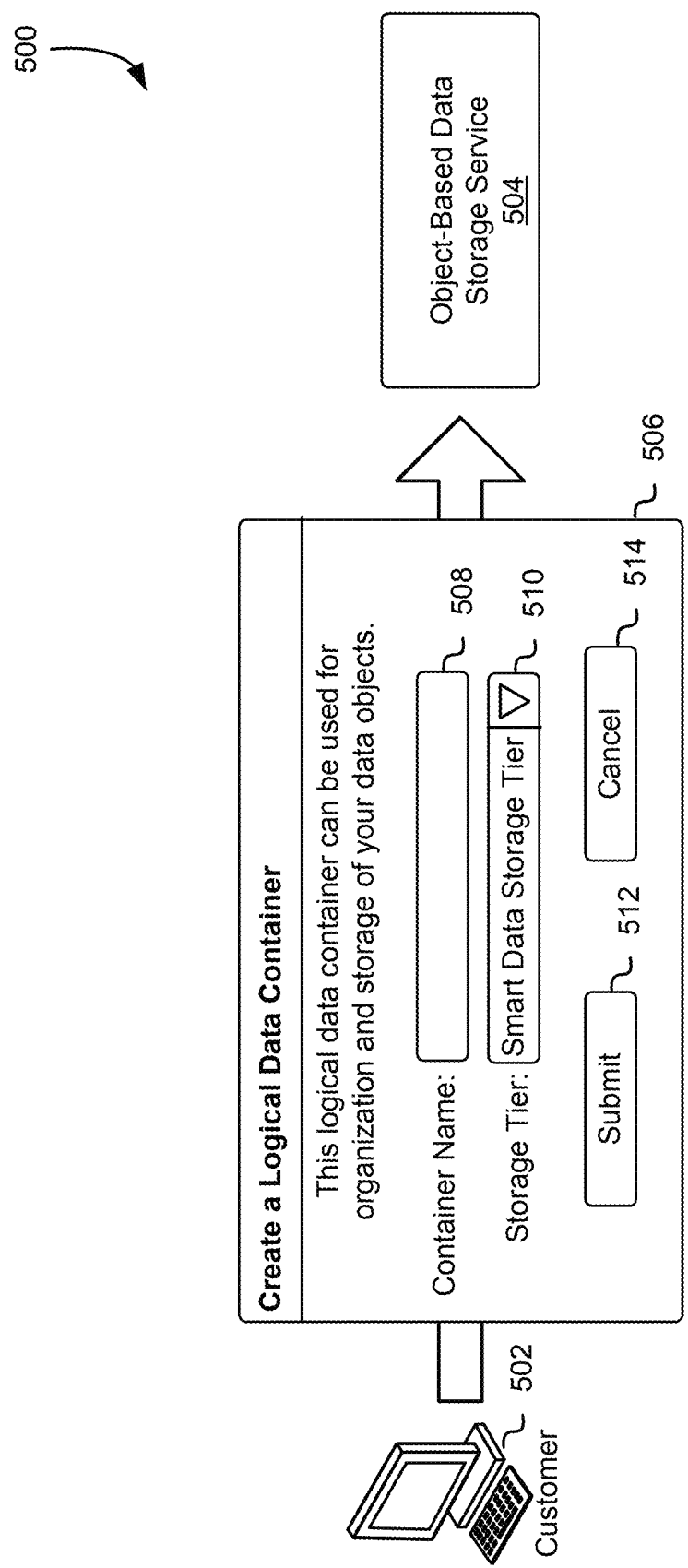
FIG. 5 shows an illustrative example of a system in which an interface is provided to a customer to request creation of a logical data container in a smart data storage tier to enable optimized placement of data objects of the logical data container in accordance with at least one embodiment.

In an embodiment, the object-based data storage service provides, via an interface, an option to customers of the object-based data storage service to generate a logical data container that can be classified as being in the smart data storage tier. Data objects stored within this logical data container may also be classified as being in the smart data storage tier and may cause the object-based data storage service to identify an optimal data storage tier for these data objects for the purpose of optimizing savings for the customer in the storage of these data objects. Accordingly, FIG. 5 shows an illustrative example of a system 500 in which an interface 506 is provided to a customer 502 to request creation of a logical data container in a smart data storage tier to enable optimized placement of data objects of the logical data container in accordance with at least one embodiment.

In the system 500, the object-based data storage service 504 provides, to a customer 502, an interface 506 usable to request creation of a logical data container for storage of data objects. In an embodiment, the interface 506 is a GUI, although requests to the object-based data storage service 504 may be submitted using API calls or other techniques. The interface 506 may include similar fields as those of the interface 306 described above in connection with FIG. 3. For example, the interface 506 may include a container name input field 508, which may be utilized by the customer 502 to provide a name for the logical data container that is being requested by the customer 502.

In an embodiment, the interface 506 includes a storage tier drop down menu 510, which the customer 502 may utilize to define the corresponding data storage tier or other data storage characteristics for the logical data container. Through use of the storage tier drop down menu 510, the customer 502 may select a smart data storage tier for the logical data container if the customer 502 wants to enable the object-based data storage service 504 to make all placement decisions with regard to data objects added to the logical data container in the smart data storage tier. Alternatively, if the customer 502 wants to define the initial storage tier for the logical data container and corresponding data objects, the customer 502 may select the standard data storage tier or the infrequent access data storage tier from the storage tier drop down menu 510.

In an embodiment, if the customer 502 selects the smart data storage tier from the storage tier drop down menu 510, the object-based data storage service 504 may omit presentation of other elements of the interface 506 that may be presented upon selection of a different data storage tier from the storage tier drop down menu 510. For example, if the customer 502 selects the smart data storage tier option from the storage tier drop down menu 510, the object-based data storage service may omit the one or more radio buttons 312, as illustrated in FIG. 3, that can be used by the customer 502 to enable automatic transitioning of data objects stored in the logical data container that is to be created. Further, the object-based data storage service 504 may omit a transition parameter drop down menu, which may typically be presented to enable the customer 502 to define the authorized transitions that may be performed by the object-based data storage service 504 for data objects stored in the logical data container. Similarly, the object-based data storage service 504 may omit the one or more radio buttons that can be used by the customer 502 to authorize the object-based data storage service 504 to utilize usage data for data objects in the logical data container for various purposes. Thus, by selecting the smart data storage tier option from the storage tier drop down menu 510, the customer 502 may grant the object-based data storage service 504 to monitor data objects in the smart data storage tier and to automatically transition these data objects to optimal placement locations based at least in part on the usage data for the data objects and for other similar data objects, identified based at least in part on the characteristics of the data objects in the smart data storage tier.

Similar to the storage tier drop down menu 322 described above in connection with FIG. 3, the data storage characteristics specified via the storage tier drop down menu 510 may each correspond to a set of data storage parameters. These sets of data storage parameters may each specify one or more risks corresponding to storage of a data object amongst the various data storage tiers made available by the object-based data storage service. In an embodiment, if the customer selects, from the storage tier drop down menu 510, the smart data storage tier, the object-based data storage service determines that the object-based data storage service assumes the risk of incurring greater costs if a data object stored in a logical data container corresponding to the standard data storage tier is utilized infrequently or at a rate that would make it more expensive to the object-based data storage service versus storing the data object in another data storage tier. As another example, if the customer selects the smart data storage tier from the storage tier drop down menu 510, the object-based data storage tier may assume the risk of incurring greater costs if a data object stored in a logical data container corresponding to the infrequent access data storage tier is accessed at a rate that would result in greater cost to the object-based data storage service versus storing the data object in the standard data storage tier. Thus, if the customer 502 selects, from the storage tier drop down menu 510, the smart data storage tier, the customer 502 may incur a fixed cost for storage of the data object while the object-based data storage service assumes the risks associated with access to the data object in the various data storage tiers (e.g., standard, infrequent access, archival, etc.). In an embodiment, the object-based data storage service utilizes the set of data storage parameters to determine the initial data storage tier for storage of the data object.

In an embodiment, selection of the smart data storage tier via the storage tier drop down menu 510 serves as an authorization, granted by the customer 502 to the object-based data storage service, to enable selection of an initial data storage tier (e.g., standard, infrequent access, archival, etc.) from the plurality of data storage tiers for the data object. Further, selection of the smart data storage tier may also serve as an authorization to transition the data object among the plurality of data storage tiers as determined by the object-based data storage service based at least in part on usage data for the data object and the set of data storage parameters (e.g., risks of maintaining a data object in a more expensive data storage tier based at least in part on the usage data, etc.).

If the customer 502 selects another option from the storage tier drop down menu 510, the object-based data storage service 504 may revise the interface 506 to include the features described above in connection with the interface 306 illustrated in FIG. 3. If the customer 502 selects the smart data storage tier option from the storage tier drop down menu 510, the customer 502 may select the submit button 512 to submit a request to the object-based data storage service 504 to generate the logical data container in the smart data storage tier. However, if the customer 502 wishes to cancel its request, the customer 502 may select the cancel button 514, which may cause the object-based data storage service 504 to terminate the interface 506 without obtaining the request from the customer 502.

Figure 6:
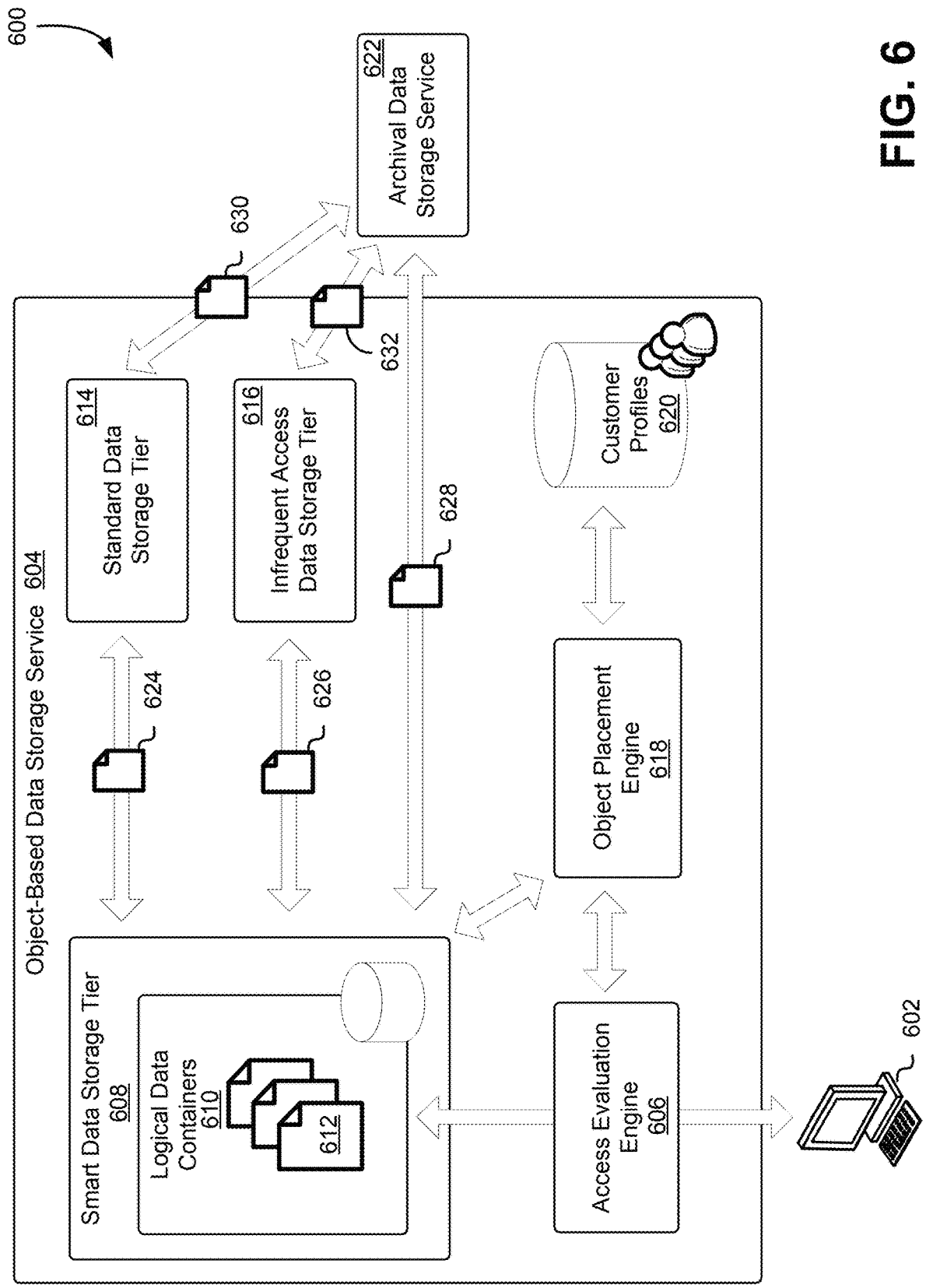
FIG. 6 shows an illustrative example of a system in which historical access data for data objects stored in a smart data storage tier is utilized to determine a placement for the data objects in accordance with at least one embodiment.

FIG. 6 shows an illustrative example of a system 600 in which historical access data for data objects 612 stored in a smart data storage tier 608 is utilized to determine a placement for the data objects 612 in accordance with at least one embodiment. In the system 600, a customer 602 of the object-based data storage service 604 submits a request to store one or more data objects 612 in a logical data container 610 corresponding to a smart data storage tier 608. In response to the request, the object placement engine 618 accesses the customer's profile from a customer profile datastore 620 to identify the customer's other data objects that may be stored in a logical data container 610 corresponding to the smart data storage tier 608, in other data storage tiers (e.g., standard data storage tier 614, infrequent access data storage tier 616), and in the archival data storage service 622. The object placement engine 618 may obtain, from the access evaluation engine 606, usage data corresponding to these data objects.

In an embodiment, the object placement engine 618 evaluates the one or more data objects 612 that the customer has stored in the smart data storage tier 608 to identify the characteristics of these data objects 612. For instance, the object placement engine 618 may identify the size of each data object, the age of each data object, the type of data object, and the like. This information may be used by the object placement engine 618 to identify similar data objects stored in the smart data storage tier 608, in the other data storage tiers, and in the archival data storage service 622. Further, the object placement engine 618 may obtain, from the access evaluation engine 606, usage data for these similar data objects.

The object placement engine 618 may utilize the usage data for the similar data objects and the customer's other data objects and the characteristics of the data object added to the smart data storage tier 608 as input to one or more machine learning algorithms to identify an optimal storage location for the data object. For instance, if the object placement engine 618 determines that a data object 624 added to the smart data storage tier 608 by the customer 602 is similar to other data objects stored in logical data containers corresponding to the standard data storage tier 614 and that the customer 602 utilizes its other data objects at a high frequency, the object placement engine 618 may store the data object 624 in association with the standard data storage tier 614. For example, the object placement engine 618 may transition the data object 624 to a logical data container corresponding to the standard data storage tier 614. Further, the object placement engine 618 may update metadata of the data object 624 to indicate that the data object 624 is associated with the smart data storage tier 608. This information may also be included in the customer's profile. Thus, if the customer 602 submits a request to access the data object 624, the object-based data storage service 604 may indicate that this data object 624 is in the smart data storage tier 608 instead of being in the standard data storage tier 614.

As another example, if the object placement engine 618 determines that a data object 626 added to the smart data storage tier 608 by the customer 602 is similar to other data objects stored in logical data containers corresponding to the infrequent access data storage tier 616 and that the customer 602 utilizes its other data objects at a lesser rate, the object placement engine 618 may store the data object 626 in association with the standard data storage tier 616. The object placement engine 618 may transition the data object 626 to a logical data container corresponding to the infrequent access data storage tier 616 and may update metadata of the data object 626 to indicate that the data object 626 is associated with the smart data storage tier 608. Similarly, if the object placement engine 618 determines that a data object 628 added to the smart data storage tier 608 is similar to other data objects stored in archives of the archival data storage service 622 and that the customer 602 is unlikely to utilize the data object 628 at a significant rate (e.g., the data object 628 includes backup data, etc.), the object placement engine 618 may transition the data object 628 to an archive of the archival data storage service 622.

In an embodiment, once an initial placement decision is made for a data object from the smart data storage tier 608, the access evaluation engine 606 monitors and records requests from the customer 602 or other users to access and utilize data objects in the logical data containers of the various data storage tiers. For example, if a customer 602 accesses one or more data objects from logical data containers corresponding to the standard data storage tier 614, the access evaluation engine 606 may monitor, for each data object, the use of the data object, the length of such usage, the time at which the data object was used, and the like. Similarly, if a customer 602 access one or more data objects from logical data containers corresponding to the infrequent access data storage tier 616, the access evaluation engine 606 may monitor, for each data object, the use of the data object, the length of such usage, the time at which the data object was used, and the like. This data may be recorded in a data log that is maintained by the access evaluation engine 606.

The object placement engine 618 may obtain the data recorded in the data log to evaluate the usage of the data objects 612 of the smart data storage tier 608, along with the characteristics of these data objects 612 and those of similar data objects, to determine whether these data objects 612 are stored in their optimal placement locations. For example, if the object placement engine 618 determines that a data object, stored in the standard data storage tier 614, is being utilized at a lower frequency than that of other data objects in the standard data storage tier 614, the object placement engine 618 may transfer the data object to the infrequent access data storage tier 616. Similarly, if the frequency at which the data object 630 is utilized is below a particular usage threshold, the object placement engine 618 may transfer the data object 630 to the archival data storage service 622. The object placement engine 618 may maintain the metadata for the data object 630 to maintain an association between the data object 630 and the smart data storage tier 608. Thus, even if the data object is transitioned between tiers and the archival data storage service 622 (e.g., data object 630, data object 632, etc.), the customer 602 is presented with the data object as if the data object is in a logical data container 610 of the smart data storage tier 608.

Figure 7:
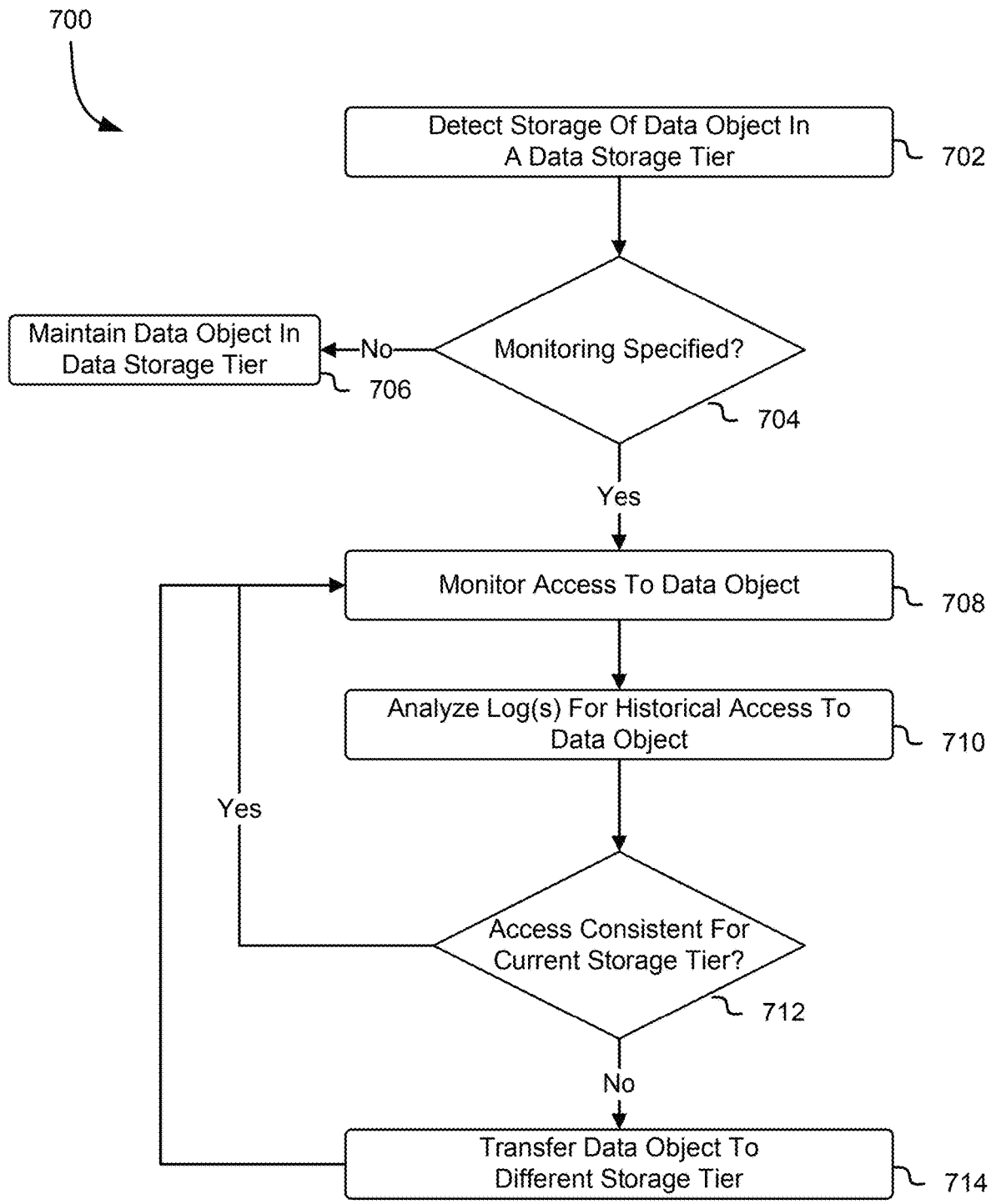
FIG. 7 shows an illustrative example of a process for monitoring usage of a data object to determine optimal placement of the data object in response to a request from a customer to automatically transition the data object in accordance with at least one embodiment.

FIG. 7 shows an illustrative example of a process 700 for monitoring usage of a data object to determine optimal placement of the data object in response to a request from a customer to automatically transition the data object in accordance with at least one embodiment. The process 700 may be performed by a computer system or abstraction thereof (such as one or more virtual machines operating via a hypervisor) of the object-based data storage service, such as an access evaluation engine, described herein. In an embodiment, the access evaluation engine detects 702 storage of a data object in a logical data container of a particular data storage tier. This data storage tier may correspond to either the standard data storage tier or the infrequent access data storage tiers described above. A request to store the data object in a particular data storage tier may be submitted by a customer of the object-based data storage service via an interface, such as the interface 306 described above in connection with FIG. 3. Through this interface, the customer may specify whether the object-based data storage service may monitor usage of this data object and whether the object-based data storage service may automatically transition data objects between these data storage tiers and/or an archival data storage service. Thus, based at least in part on the customer inputs via the interface, the access evaluation engine may determine 704 whether monitoring of the data object has been specified.

If the customer has specified that the object-based data storage service is not to monitor usage of the data object, the access evaluation service may maintain 706 the data object in the data storage tier in which the data object is stored. Thus, regardless of any variation in usage, the data object may remain in its original data storage tier. However, if the customer has indicated that the object-based data storage service is to monitor usage of the data object, the access evaluation engine may monitor 708 and record any access to the data object in a data log corresponding to the data object.

The access evaluation engine may analyze 710 these data logs to identify historical access to the data object over time. Using these data logs, the access evaluation engine may determine the frequency at which the data object is accessed by the customer and other users. Further, in some embodiments, the access evaluation engine evaluates other data objects in the data storage tier to compare the usage frequency of these data objects to that of the data object stored by the customer in the data storage tier. In an embodiment, the access evaluation engine utilizes this information as input into one or more machine learning algorithms, as described herein, to obtain an output corresponding to the optimal storage location for the data object. Thus, based at least in part on this output and the data obtained through evaluation of the data logs, the access evaluation engine may determine 712 whether access to the data object over time is consistent with the desired usage frequency for storage in the current data storage tier.

If the access evaluation engine determines that access to the data object over time is consistent with the desired usage frequency for storage in the current data storage tier, the access evaluation engine may maintain the data object in its current data storage tier and continue to monitor 708 further accesses to the data object. However, if the access evaluation engine determines that usage of the data object is inconsistent with the expected usage patterns for data objects within the data storage tier, the access evaluation engine may transfer 714 the data object to a different data storage tier. For instance, if the data object is stored in a standard data storage tier but the access evaluation engine determines that the data object is being utilized at a frequency that is below a threshold for the standard data storage tier, the access evaluation engine may transfer the data object to an infrequent access data storage tier or to an archival data storage service. The access evaluation engine may further monitor 708 accesses to the data object in its new data storage tier. This enables continuous optimization of storage for the data object to minimize the storage costs to the customer.

It should be noted that the process 700 may be performed using additional and/or alternative operations to those illustrated in FIG. 7. For example, in an embodiment, the output from the analysis of the data logs and the determination regarding usage of the data object can include prediction metadata for the data object. The prediction metadata may specify the optimal data storage tier for the data object based at least in part on the usage data and/or information regarding storage of the data object in accordance with the various data storage tiers based at least in part on other parameters (e.g., cost of maintaining the data object in each data storage tier in accordance with a frequency of use, etc.). The access evaluation engine may store the prediction metadata along with the data object in a corresponding logical data container or in a data archive in accordance with the data storage tier of the data object. Alternatively, the access evaluation engine may store the prediction metadata of the data object in a centralized repository of the object-based data storage service, in a database of the customer's account profile, or in another location. The access evaluation engine may provide programmatic access to the prediction metadata to other computer systems, such as a customer computer system. This may enable a customer to utilize the prediction metadata to make programmatic decisions regarding transitions of the data object among the various data storage tiers.

Figure 8:
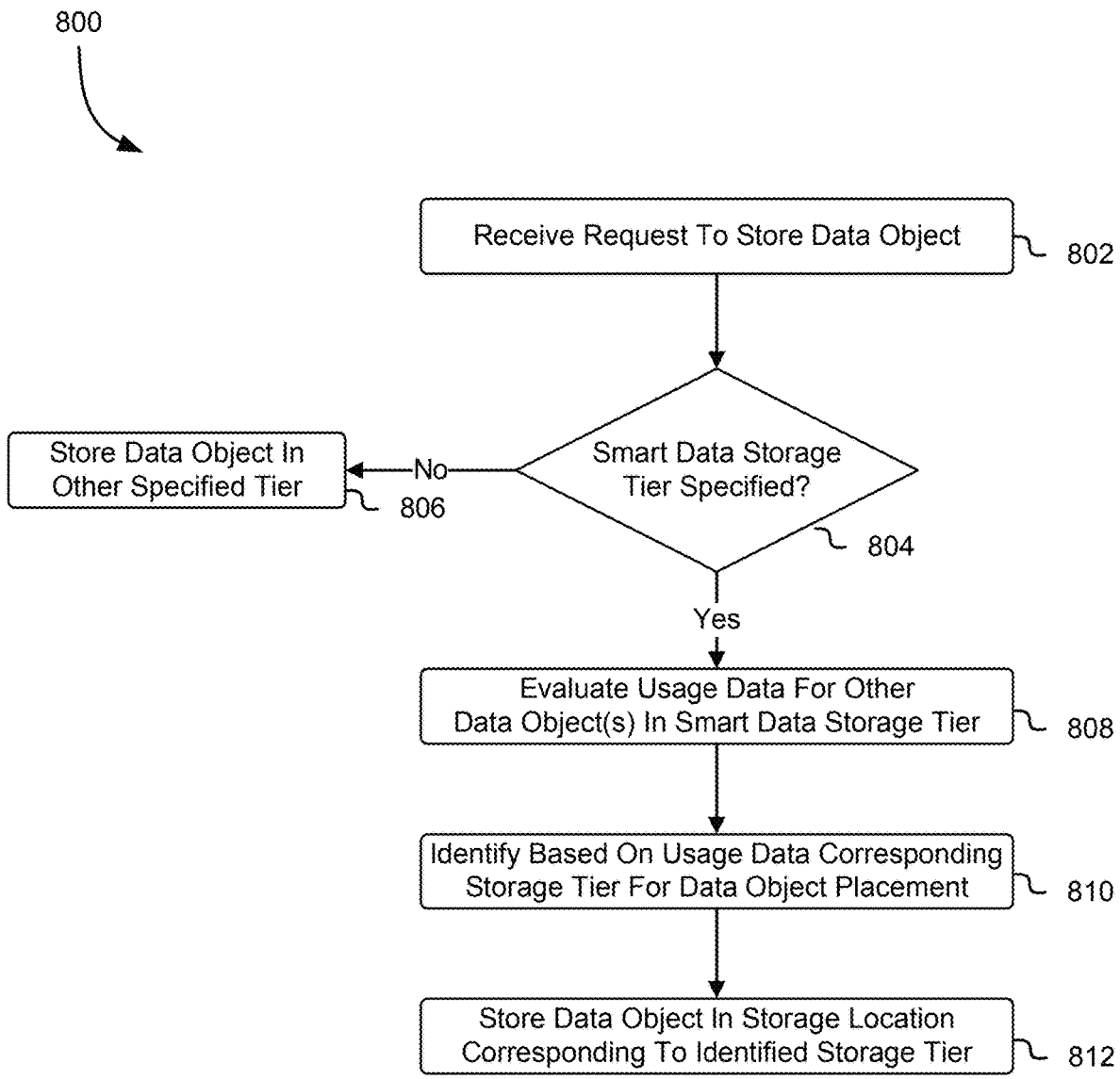
FIG. 8 shows an illustrative example of a process for utilizing usage data for other data objects in a smart data storage tier to determine initial placement of a data object in response to a request to store the data object in the smart data storage tier in accordance with at least one embodiment.

As noted above, the object-based data storage service may provide a smart data storage tier for storage of various data objects. Placement of a data object in the smart data storage tier may serve as an indication to the object-based data storage service that the object-based data storage service is to monitor usage of the data object and utilize the characteristics of the data object (e.g., size, age, type, etc.) to identify an optimal placement for the data object within one of the fee-based tiers (e.g., standard data storage tier, infrequent access data storage tier) or the archival data storage service. Thus, if a customer selects the smart data storage tier for storage of a data object, the customer need not provide an explicit indication of a fee-based data storage tier for storage of the data object, nor does the customer need to indicate whether monitoring of the data object is permitted. Accordingly, FIG. 8 shows an illustrative example of a process 800 for utilizing usage data for other data objects in a smart data storage tier to determine initial placement of a data object in response to a request to store the data object in the smart data storage tier in accordance with at least one embodiment. The process 800 may be performed by a computer system or abstraction thereof (such as one or more virtual machines operating via a hypervisor) of the object-based data storage service, such as an object placement engine, described herein.

At any time, the object-based data storage service may receive 802 a request to store a data object in a logical data container corresponding to a particular data storage tier. In an embodiment, the object-based data storage service provides an interface to customers, such as the interfaces described above in connection with FIGS. 3 and 5. Through the interface, a customer may select which data storage tier the data object is to be stored in, as well as provide an indication as to whether the object-based data storage service is to automatically transition the data object to other data storage tiers or to an archival data storage service based at least in part on an analysis of the usage of the data object over time. In an embodiment, if the customer selects a fee-based data storage tier, such as the standard data storage tier or the infrequent access data storage tier, the object-based data storage service provides the customer with various options via the interface. For example, as illustrated and described above in connection with FIG. 3, the object-based data storage service may allow customer to enable monitoring and automatic transitioning of the data object to an optimal location based at least in part on its usage. Further, the object-based data storage service may allow the customer to restrict these transitions to certain data storage tiers. For instance, the customer may define that transitions may only be made between the standard data storage tier and the infrequent access data storage tier. This would prevent the object-based data storage service from transitioning the data object to the archival data storage service.

In an embodiment, the object-based data storage service, via the interface, provides an option to the customer to store the data object in a logical data container corresponding to a smart data storage tier. Unlike the fee-based data storage tiers described above, the smart data storage tier may serve as an implicit indication that the object-based data storage service is to automatically determine initial and subsequent placement of the data object within the various fee-based data storage tiers while maintaining an association between the data object and the smart data storage tier. Thus, if the customer selects the smart data storage tier option from the interface, the customer may not be required to indicate which transitions are permitted or to indicate that monitoring of the data object is authorized as selection of the smart data storage tier may serve as an implicit indication of the customer's authorization of the object-based data storage service to monitor and automatically transition the data object based at least in part on the characteristics of the data object and the usage of the data object over time. Hence, the object-based data storage service may determine 804 whether the customer has specified that the data object be stored in a logical data container corresponding to the smart data storage tier.

If the customer has selected a different data storage tier, the object-based data storage service may store 806 the data object in a logical data container corresponding to the selected data storage tier. If the customer has specified that monitoring of the data object is authorized, the object-based data storage service may cause the access evaluation engine to initiate monitoring of the data object. Alternatively, if the customer has indicated, via the interface, that monitoring and automatic transitioning of the data object is not authorized, the object-based data storage service may maintain the data object in the selected data storage tier.

If the customer has selected the smart data storage tier, the object-based data storage service may cause an object placement engine to evaluate 808 usage data for other data objects in the smart data storage tier. For example, the object-based data storage service may evaluate the data object that is to be stored in the smart data storage tier to identify various characteristics of the data object. This may include the size of the data object, the type of the data object (e.g., file type, etc.), the age of the data object if the data object (e.g., date the data object was created, etc.), and the like. Using these characteristics, the object placement engine may identify similar data objects that may be associated with the smart data storage tier. Further, the object placement engine may identify any of the customer's other data objects maintained by the object-based data storage service or the archival data storage service. The object placement engine may obtain usage data for each of these other data objects and identify any access patterns for these data objects. This information may be used to supplement the set of data storage parameters of the data object. This set of data storage parameters may be used as input to one or more machine learning algorithms to obtain an initial placement decision for the newly added data object. Thus, based at least in part on this placement decision, the object placement engine identifies 810 a fee-based data storage tier for the data object.

The object placement engine, as a result of having identified a fee-based data storage tier for the data object, may store 812 the data object in a storage location corresponding to the identified fee-based data storage tier. For instance, if the object placement engine determines that the data object is to be stored in a location corresponding to the standard data storage tier, the object placement engine may identify a logical data container corresponding to the standard data storage tier that has capacity to enable storage of the data object. The object placement engine may update metadata of the logical data container to indicate storage of the data object therein. Further, the object placement engine maintains metadata for the data object that specifies that the data object is associated with the smart data storage tier. This may cause an access evaluation engine to monitor access and usage of the data object. The monitoring of the data object may result in data logs that may be used to determine whether the data object is to be transitioned to another fee-based data storage tier or to the archival data storage service, as needed.

Figure 9:
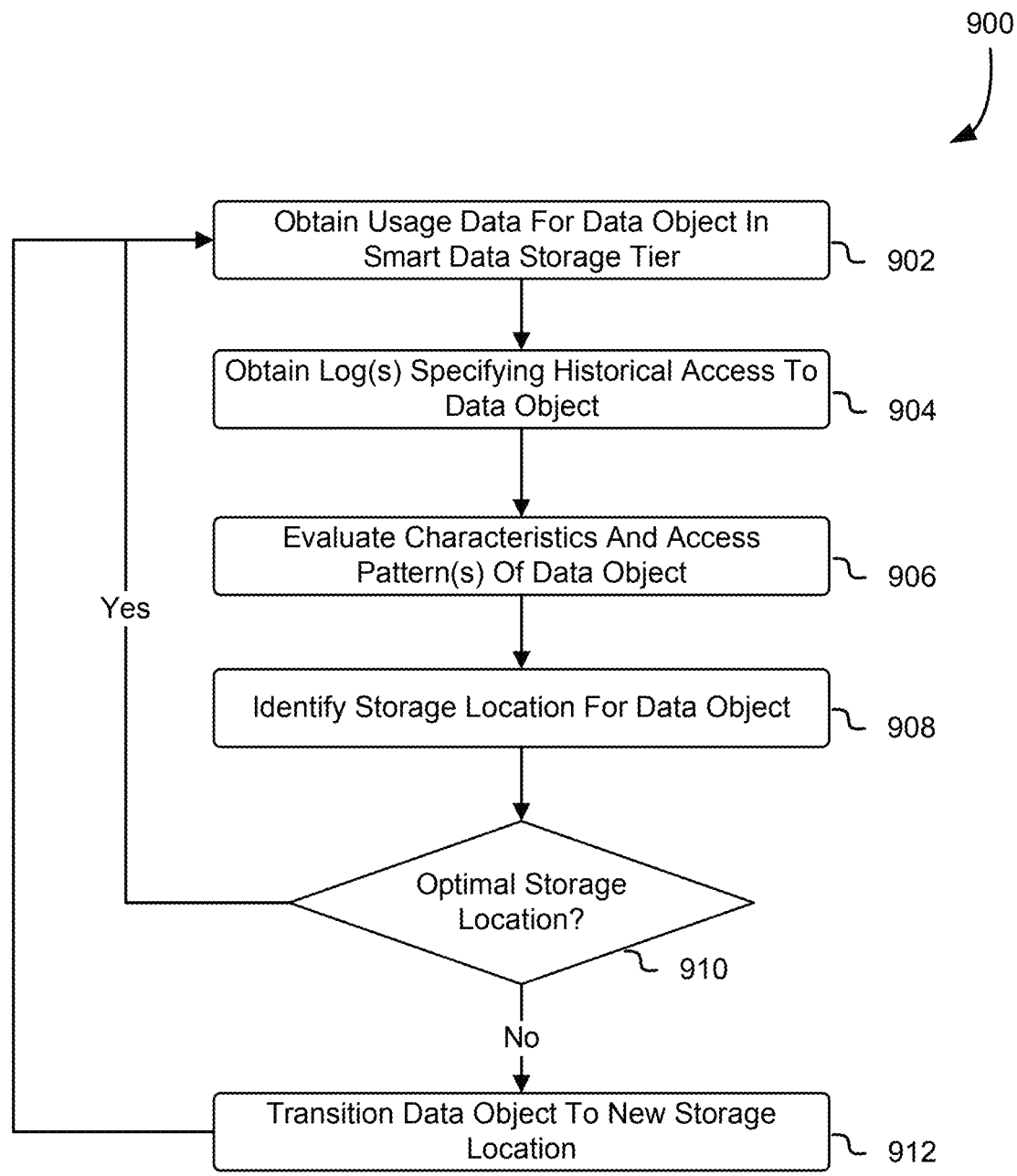
FIG. 9 shows an illustrative example of a process for utilizing characteristics and access patterns for an existing data object in a smart data storage tier to determine an optimal storage location for the data object in accordance with at least one embodiment.

As noted above, a data object associated with the smart data storage tier may be stored in a logical data container corresponding to a fee-based data storage tier or in an archive of an archival data storage service. The object-based data storage service, using an access evaluation engine, may monitor access and usage of the data object over time, which may be recorded in one or more data logs. Further, an object placement engine may utilize these logs, as well as other information regarding the data object and similar data objects, may identify an optimal storage location for the data object and transition the data object to this optimal storage location, as needed. Accordingly, FIG. 9 shows an illustrative example of a process 900 for utilizing characteristics and access patterns for an existing data object in a smart data storage tier to determine an optimal storage location for the data object in accordance with at least one embodiment. The process 900 may be performed by a computer system or abstraction thereof (such as one or more virtual machines operating via a hypervisor) of the object-based data storage service, such as an object placement engine, described herein.

The object placement engine may obtain 902, for a data object associated with the smart data storage tier, usage data from an access evaluation engine of the object-based data storage service. The object placement engine may perform this operation periodically, such as at certain time intervals (e.g., every hour, every day, every week, etc.) or in response to a triggering event (e.g., change in availability of computing resources associated with a particular data storage tier, etc.). In addition to obtaining the usage data for the data object, the object placement engine may obtain 904 one or more data logs that specify data regarding historical access over time to the data object. For instance, the usage data may specify a contemporaneous detailing of the usage of the data object by the customer and other users. The data logs may supplement this information by providing details regarding the frequency at which the data object has been used over an extended period of time, as well as the duration of each use and the purpose for each use.

In addition to obtaining the usage data and data logs for the data object, the object placement engine may evaluate 906 the characteristics of the data object and utilize the usage data and historical access data to identify one or more access patterns for the data object. These access patterns may correspond to periods of inactivity and periods of elevated activity for the data object. This information may be utilized to supplement the set of data storage parameters for the data object, as described below, to identify an optimal placement for the particular data object during these identified periods.

The object placement engine may identify 908 the current storage location for the data object. As described above, although the data object may be associated with a set of data storage characteristics classified as being the smart data storage tier, the data object may be stored in a logical data container corresponding to a fee-based data storage tier (e.g., standard data storage tier, infrequent access data storage tier, etc.) or in an archive of an archival data storage service. Thus, the object placement engine may utilize metadata of the data object to determine the storage location of the data object and the corresponding data storage tier that it is located in. In an embodiment, the object placement engine utilizes the usage data and the set of data storage parameters, which may include the associated risks for maintaining the data object in the current storage location, historical access data, the characteristics of the data object, and the access patterns for the data object, as input to one or more machine learning algorithms to determine an optimal data storage location for the data object. Using the output of these algorithms, the object placement engine may determine 910 whether the data object is in an optimal storage location (e.g., in a storage location corresponding to the optimal data storage tier for the data object).

If the data object is already in the optimal storage location, the object placement engine may continue to analyze the characteristics and the data associated with the data object to determine whether the data object is to be transitioned to another storage location at another time. However, if the object placement engine determines that the data object is not in its optimal storage location, the object placement engine may transition 912 the data object to this new storage location. For instance, the object placement engine may modify metadata associated with a logical data container corresponding to the optimal data storage tier to indicate storage of the data object within the logical data container. Further, the object placement engine may revise the metadata of the former logical data container that stored the data object to indicate removal of the data object from the logical data container. Once the data object has been transitioned to the new storage location, the object placement engine may continue to analyze the characteristics and the data associated with the data object to determine whether the data object is to be transitioned to another storage location as needed. Thus, the object placement engine may transition the data object as needed and ensure optimized placement on behalf of the customer, without the customer needed to indicate any transition parameters for the data object.

Figure 10:
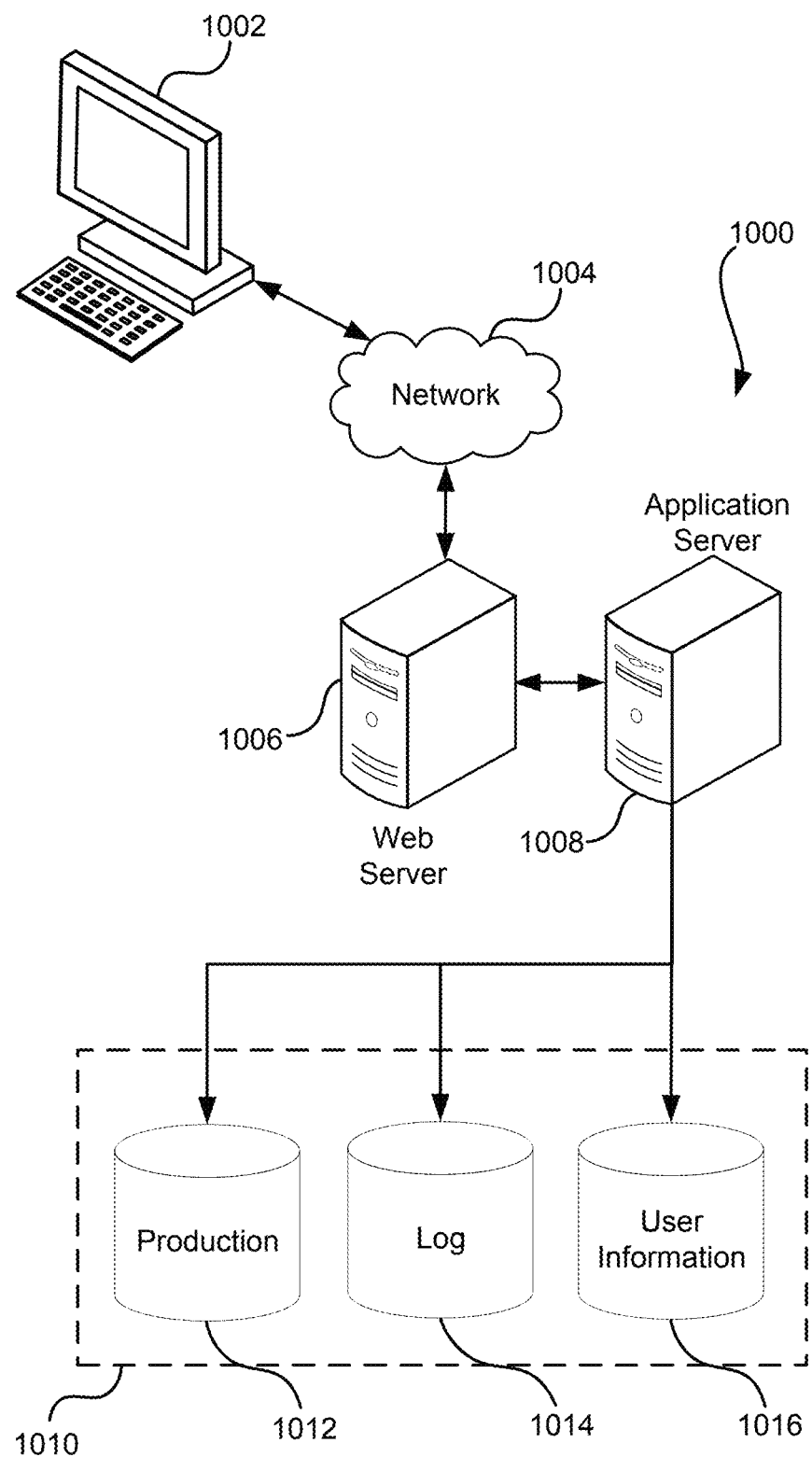
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a data storage service, a request to store a data object, the request specifying a set of-storage parameters associated with the request and defining one or more rules specifying a movement of the data object amongst a set of data storage tier classifications based on at least one time-based threshold, the set of data storage tier classifications comprising at least a source data storage tier classification and a destination data storage tier classification;
   determining, based at least in part on the set of data storage parameters, the source data storage tier classification;
   storing the data object in a first location corresponding to the source data storage tier classification;
   determining an access pattern of the data object, the access pattern comprising a time since the data object was most recently accessed while stored in the source data storage tier classification;
   determining, based at least in part on comparing the access pattern of the data object with the at least one time-based threshold, that the data object is to be reclassified as corresponding to the destination data storage tier classification; and
   re-classifying the data object from the source data storage tier classification to the destination data storage tier classification and storing the data object in a second location corresponding to the destination data storage tier classification.

2. The computer-implemented method of claim 1, wherein the source data storage tier classification comprises a frequent access data storage tier classification and the destination data storage tier classification comprises an infrequent access data storage tier classification.

3. The computer-implemented method of claim 1, wherein the destination data storage tier classification comprises a classification of one a frequent access data storage tier classification, one or more infrequent access data storage tier classifications, or an archival data storage tier classification.

4. The computer-implemented method of claim 1, wherein the data object comprises a group of data objects associated with a logical data container.

5. The computer-implemented method of claim 4, wherein the one or more rules applies to a subset of data objects in the group of data objects in the logical data container.

6. The computer-implemented method of claim 1, further comprising:
   receiving an additional request to access the data object in the destination storage tier, and
   based at least in part on receiving the request, reverting the data object to the source data storage tier classification and storing the data object in a third location corresponding to the source data storage tier.

7. The computer-implemented method of claim 1, wherein the one or more rules comprises a second rule specifying the movement of the data object amongst a set of data storage tier classifications based on a time the data object was last modified being equal to or above at least one modification time threshold.

8. A system, comprising:
one or more processors; and
memory storing computer-executable instructions that, upon execution, cause the one or more processors to:
receive a request to store a group of data objects in a logical data container, the request indicating a set of data storage parameters including at least a selection of auto reclassification of individual data objects of the group of data objects stored in the logical data container among a group of different data storage tiers based on access patterns of the individual data objects;
classify the group of data objects as corresponding to a frequent access data storage tier among the group of data storage tiers based on the set of data storage parameters, the group of data storage tiers comprising at least the frequent access data storage tier and at least one infrequent access data storage tier;
determine an access pattern of at least one data object of the group of data objects;
determine, based at least in part on comparing the access pattern of the data object with at least one threshold, that the data object is to be reclassified as corresponding to the at least one infrequent access data storage tier; and
reclassify at least the data object of the group of data objects from the frequent access data storage tier to the at least one infrequent access data storage tier.

9. The system of claim 8, wherein the access pattern comprises an elapsed time since the data object was most recently accessed while stored in the frequent access data storage tier, and wherein the at least one threshold comprises a first length of time.

10. The system of claim 8, wherein the access pattern comprises a second elapsed time since the data object was most recently modified while stored in the frequent access data storage tier, and wherein the at least one threshold comprises a second length of time.

11. The system of claim 9, wherein the access pattern additionally comprises a second elapsed time since the data object was most recently modified while stored in the frequent access data storage tier, and wherein the at least one threshold comprises a second length of time.

12. The system of claim 8, wherein the computer-executable instructions further cause the one or more processors to:
receive an additional request to access the data object in the at least one infrequent access data storage tier, and
based at least in part on receiving the request, revert the data object to the frequent access data storage tier classification and store the data object in a third location corresponding to the frequent access data storage tier.

13. The system of claim 8, wherein the selection of auto reclassification applies to a subset of data objects in the group of data objects in the logical data container.

14. A non-transitory computer-readable storage medium storing thereon executable instructions that, as a result of being executed by one or more processors of a computer system, cause the computer system to at least:
receive a request to store a data object in a bucket, the request indicating a set of data storage parameters comprising a lifecycle rule specifying automatic movement of the data object among a group of different data storage classes based on an access pattern of the data object;
associate the data object with a standard storage class among the group of data storage classes, the group of data storage classes comprising at least the standard storage class, and an infrequent access storage class;
determine the access pattern of the data object;
determine, based at least in part on the access pattern of the data object, that the data object is to be reclassified as corresponding to the infrequent access storage class; and
reclassify the data object from the standard storage class to the infrequent access storage class.

15. The non-transitory computer-readable storage medium of claim 14, wherein the standard storage class comprises a frequently accessed storage class.

16. The non-transitory computer-readable storage medium of claim 14, wherein the executable instructions further comprise additional instructions that, as a result of being executed by the one or more processors of the computer system, further cause the computer system to at least:
receive an additional request to access the data object in the at least one infrequent access storage class, and
based at least in part on receiving the request, revert the data object to the standard storage class and store the data object in a third location corresponding to the standard storage class.

17. The non-transitory computer-readable storage medium of claim 14, wherein, the access pattern comprises an elapsed time since the data object was most recently accessed while stored in the standard storage class, and wherein the at least one threshold comprises a first length of time.

18. The non-transitory computer-readable storage medium of claim 14, wherein the access pattern comprises a second elapsed time since the data object was most recently modified while stored in the standard storage class, and wherein the at least one threshold comprises a second length of time.

19. The non-transitory computer-readable storage medium of claim 18, wherein the access pattern additionally comprises a second elapsed time since the data object was most recently modified while stored in the standard storage class, and wherein the at least one threshold comprises a second length of time.

20. The non-transitory computer-readable storage medium of claim 14, wherein the data object comprises a group of data objects associated with the bucket.

* * * * *